US011341219B2

(12) United States Patent
Kwon et al.

(10) Patent No.: US 11,341,219 B2
(45) Date of Patent: May 24, 2022

(54) APPARATUS FOR UNLOCKING ELECTRONIC DEVICE BY USING STYLUS PEN AND METHOD THEREOF

(71) Applicant: Samsung Electronics Co., Ltd., Gyeonggi-do (KR)

(72) Inventors: Zion Kwon, Gyeonggi-do (KR); Heewoon Kim, Gyeonggi-do (KR); Hyunmi Park, Gyeonggi-do (KR); Hyewon Park, Gyeonggi-do (KR); Chaewon Seo, Gyeonggi-do (KR); Hyungdo Lee, Gyeonggi-do (KR); Jongwu Baek, Gyeonggi-do (KR)

(73) Assignee: Samsung Electronics Co., Ltd

(*) Notice: Subject to any disclaimer, the term of this patent is extended or adjusted under 35 U.S.C. 154(b) by 181 days.

(21) Appl. No.: 16/533,286

(22) Filed: Aug. 6, 2019

(65) Prior Publication Data
US 2020/0042680 A1 Feb. 6, 2020

(30) Foreign Application Priority Data

Aug. 6, 2018 (KR) .................. 10-2018-0091087

(51) Int. Cl.
*G06F 21/31* (2013.01)
*G06F 3/0354* (2013.01)
(Continued)

(52) U.S. Cl.
CPC ............ *G06F 21/316* (2013.01); *G06F 3/038* (2013.01); *G06F 3/03545* (2013.01); *G06F 3/0482* (2013.01); *G06F 3/0488* (2013.01); *G06F 3/04847* (2013.01); *G06F 21/32* (2013.01); *G06F 2203/0384* (2013.01)

(58) Field of Classification Search
CPC .... G06F 21/316; G06F 21/32; G06F 3/03545; G06F 3/038; G06F 3/0482; G06F 3/04847; G06F 3/0488
See application file for complete search history.

(56) References Cited

U.S. PATENT DOCUMENTS 7,825,820 B2 11/2010 Lee
8,620,344 B2 12/2013 Huang et al.
(Continued)

FOREIGN PATENT DOCUMENTS

| KR | 1020130134017 | 12/2013 |
| KR | 1020170139979 | 12/2017 |
| KR | 1020180004552 | 1/2018 |

OTHER PUBLICATIONS

International Search Report dated Dec. 2, 2019 issued in counterpart application No. PCT/KR2019/009769, 12 pages.
(Continued)

*Primary Examiner* — Seth A Silverman
(74) *Attorney, Agent, or Firm* — The Farrell Law Firm, P.C.

(57) ABSTRACT

Disclosed is an electronic device that receives a first input received through a stylus pen connected with the electronic device through wireless communication in a lock state of the electronic device, identifies unlock history information by at least one user authentication method in response to receiving the first input, and changes a state of the electronic device to an unlock state, based at least partially on an existence of the identified unlock history information.

19 Claims, 17 Drawing Sheets

(51) Int. Cl.
  *G06F 3/038* (2013.01)
  *G06F 3/0488* (2022.01)
  *G06F 3/0482* (2013.01)
  *G06F 21/32* (2013.01)
  *G06F 3/04847* (2022.01)

(56) References Cited

U.S. PATENT DOCUMENTS

| | | |
|---|---|---|
| 9,137,254 B2 | 9/2015 | Bilbrey et al. |
| 9,210,529 B2 | 12/2015 | Huang et al. |
| 9,817,464 B2 | 11/2017 | Je et al. |
| 9,817,965 B2 | 11/2017 | Engelhardt et al. |
| 9,946,886 B2 | 4/2018 | Engelhardt et al. |
| 9,958,990 B2 | 5/2018 | Yilmaz et al. |
| 9,965,107 B2 | 5/2018 | Yilmaz et al. |
| 10,007,362 B2 | 6/2018 | Kim et al. |
| 10,230,722 B2 | 3/2019 | Wilson et al. |
| 10,496,732 B2 * | 12/2019 | Lee ................. G06F 9/451 |
| 2009/0085760 A1 | 4/2009 | Lee |
| 2010/0333215 A1* | 12/2010 | Wang ............... G06F 1/1643 726/34 |
| 2011/0162048 A1 | 6/2011 | Bilbrey et al. |
| 2011/0250875 A1 | 10/2011 | Huang et al. |
| 2012/0127096 A1* | 5/2012 | Chan ................ G06F 1/1626 345/173 |
| 2012/0239950 A1 | 9/2012 | Davis et al. |
| 2012/0242603 A1 | 9/2012 | Engelhardt et al. |
| 2013/0082937 A1 | 4/2013 | Liu et al. |
| 2013/0106741 A1 | 5/2013 | Pedersen et al. |
| 2013/0106777 A1 | 5/2013 | Yilmaz et al. |
| 2013/0106799 A1 | 5/2013 | Yilmaz et al. |
| 2013/0106800 A1 | 5/2013 | Yilmaz et al. |
| 2014/0113613 A1 | 4/2014 | Huang et al. |
| 2014/0173758 A1 | 6/2014 | Bilbrey et al. |
| 2014/0192031 A1 | 7/2014 | Je et al. |
| 2014/0253461 A1* | 9/2014 | Hicks ................. G06F 21/31 345/173 |
| 2014/0253464 A1* | 9/2014 | Hicks ............... G06F 3/0488 345/173 |
| 2015/0026819 A1* | 1/2015 | Bos .................. G06F 21/53 726/27 |
| 2016/0054821 A1 | 2/2016 | Kim et al. |
| 2016/0109968 A1 | 4/2016 | Roh et al. |
| 2016/0300049 A1* | 10/2016 | Gu .................... G06F 21/316 |
| 2016/0359848 A1 | 12/2016 | Wilson et al. |
| 2017/0109516 A1 | 4/2017 | Engelhardt et al. |
| 2018/0004406 A1 | 1/2018 | Jung et al. |
| 2018/0032163 A1 | 2/2018 | Park et al. |
| 2018/0067755 A1* | 3/2018 | Rhee ................. G06F 21/36 |
| 2018/0107813 A1 | 4/2018 | Perotti |
| 2018/0335936 A1* | 11/2018 | Missig ............. G06F 3/04817 |
| 2019/0281047 A1 | 9/2019 | Wilson et al. |

OTHER PUBLICATIONS

European Search Report dated Dec. 2, 2019 issued in counterpart application No. 19190264.2-1218, 9 pages.

* cited by examiner

APPARATUS FOR UNLOCKING ELECTRONIC DEVICE BY USING STYLUS PEN AND METHOD THEREOF

CROSS-REFERENCE TO RELATED APPLICATION(S)

This application is based on and claims priority under 35 U.S.C. § 119 to Korean Patent Application No. 10-2018-0091087, filed on Aug. 6, 2018, in the Korean Intellectual Property Office, the disclosure of which is incorporated herein by reference in its entirety.

BACKGROUND

1. Field

The disclosure relates generally to an electronic device, and more particularly, to an apparatus for unlocking an electronic device by using a stylus pen and a method thereof.

2. Description of Related Art

An electronic device may include a stylus pen capable of being inserted into or detached from the electronic device. The stylus pen may provide an environment where a user inputs handwriting on a display of the electronic device.

The electronic device may operate in a lock state to protect personal information of the user. When the electronic device operates in the lock state, the electronic device may restrict an access of a user (or a third party) who attempts to execute a function of the electronic device.

When a user input is not received during a specified time or depending on a user input corresponding to pressing a button mounted on an electronic device, the electronic device may change a state of the electronic device to a lock state. The electronic device may change the state of the electronic device from the lock state to an unlock state, depending on a user input (e.g., a password) received in the lock state.

When the state of the electronic device is changed to the lock state while the user uses a stylus pen, the continuity of use may decrease. To secure continuity of use of the stylus pen, a manner to change the state of the electronic device through a user interface (e.g., a button) included in the stylus pen may be considered. However, when the user loses the stylus pen detached from the electronic device, because a third party that recovers the stylus pen may unlock the electronic device, the security of the electronic device may be compromised.

As such, there is a need in the art for a method and apparatus that ensures device security while enabling the device to be unlocked in a simplified, yet safe manner.

SUMMARY

Aspects of the disclosure are to address at least the above-mentioned problems and/or disadvantages and to provide at least the advantages described below. Accordingly, an aspect of the disclosure is to provide an apparatus and a method capable of unlocking an electronic device while maintaining device security.

In accordance with an aspect of the disclosure, an electronic device includes a housing, a touchscreen display viewable through a portion of the housing, a stylus pen sensible by the touchscreen display and including a user interface, a wireless communication circuit disposed within the housing, a processor disposed within the housing and operatively connected with the touchscreen display and the wireless communication circuit, and a memory disposed within the housing and operatively connected with the processor, wherein the memory is configured to store unlock history information of a user of the electronic device by at least one user authentication method and at least one application program, and wherein the memory stores instructions that, when executed, cause the processor to receive a first input received through the user interface of the stylus pen, through the wireless communication circuit, in a lock state of the electronic device, identify the stored unlock history information of the user of the electronic device by the at least one user authentication method, in response to receiving the first input, and change a state of the electronic device to an unlock state, based at least partially on existence of the identified unlock history information.

In accordance with another aspect of the disclosure, a method of an electronic device includes receiving a first input from a stylus pen connected with the electronic device through wireless communication, in a lock state of the electronic device, identifying unlock history information of a user of the electronic device by at least one user authentication method, in response to receiving the first input, and changing a state of the electronic device to an unlock state, based at least partially on existence of the identified unlock history information.

BRIEF DESCRIPTION OF THE DRAWINGS

The above and other aspects, features, and advantages of certain embodiments of the disclosure will be more apparent from the following description taken in conjunction with the accompanying drawings, in which.

With regard to description of drawings, similar components may be marked by similar reference numerals.

DETAILED DESCRIPTION

Hereinafter, embodiments of the disclosure will be described with reference to accompanying drawings, in which a size of each component may be exaggerated for convenience. Detailed descriptions of known functions and configurations incorporated here will be omitted for the sake of clarity and conciseness.

The electronic device may be one of various types of electronic devices and may include a portable communication device (e.g., a smartphone), a computer device, a portable multimedia device, a portable medical device, a camera, a wearable device, or a home appliance. However, the electronic devices are not limited to those described above.

It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspect, such as importance or order. It is to be understood that if an element, such as a first element, is referred to, with or without the term "operatively" or "communicatively", as "coupled with," "coupled to," "connected with," or "connected to" another element, such as a second element, it indicates that the first element may be directly or indirectly coupled with the second element, or may be coupled to the second element via a third element.

In the specification, a "user interface" may be a physical medium or a virtual medium that enables the user to interact with an electronic device or a digital pen. For example, the "user interface" may be a physical button that is attached on one side surface of an electronic device or may be a screen, a sound, or a vibration that is output through the electronic device.

Figure 1:
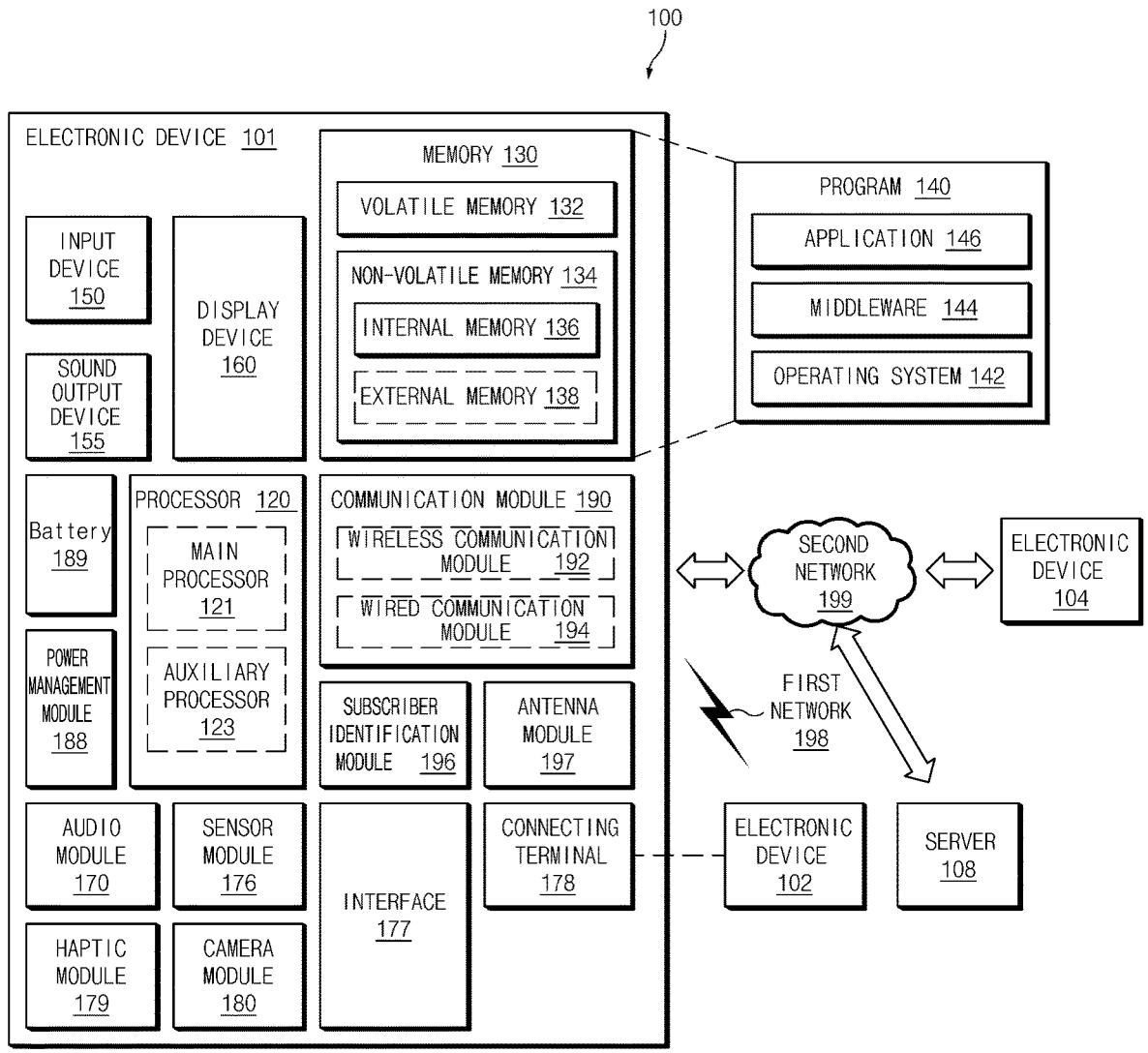
FIG. 1 illustrates an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module (SIM) card 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate, such as a printed circuit board (PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
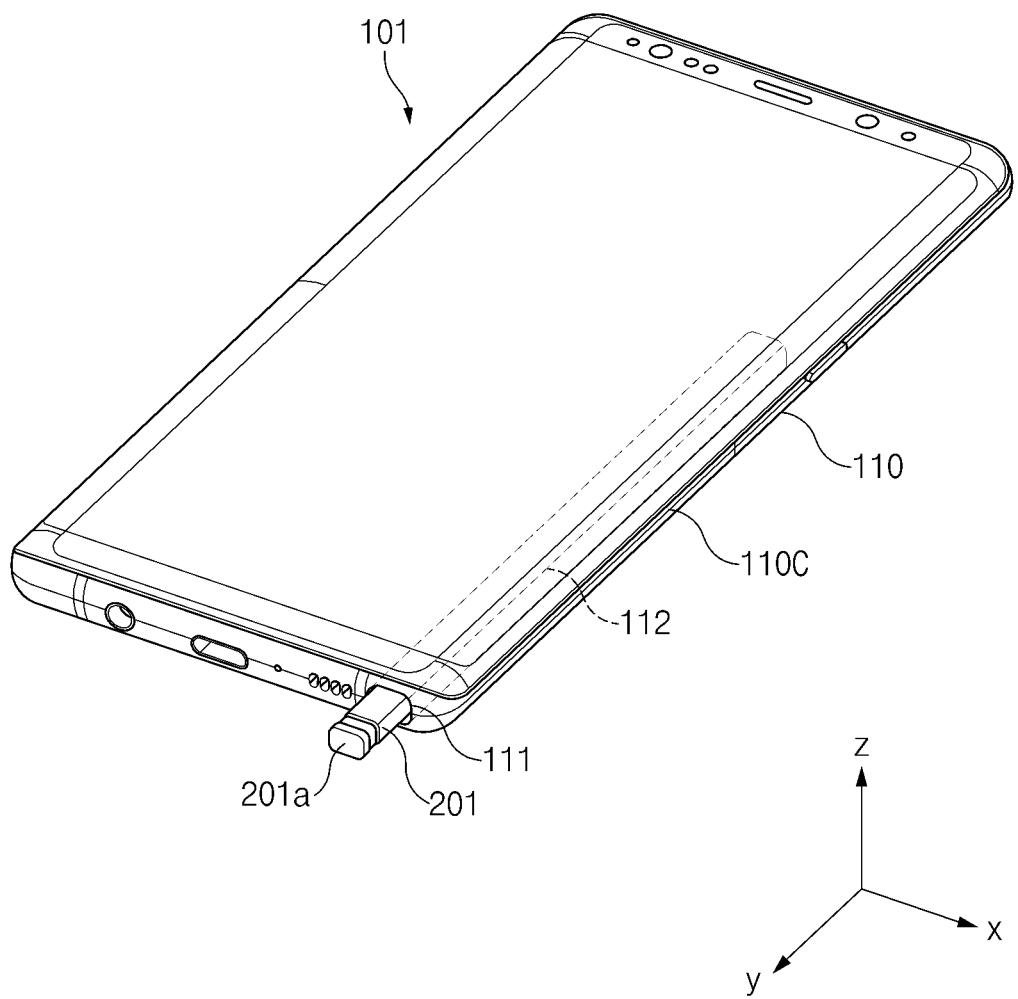
FIG. 2 is a perspective view of an electronic device including a digital pen according to an embodiment.

FIG. 2 is a perspective view of the electronic device 101 including a digital pen 201 according to an embodiment.

Referring to FIG. 2, the electronic device 101 may include the configuration illustrated in FIG. 1, and may include a structure in which the digital (stylus) pen 201 may be inserted. The electronic device 101 may include a housing 110, a hole 111 in one portion such as a side surface 110C of the housing 110, and a receiving space 112 connected with the hole 111, and the digital pen 201 may be inserted into the receiving space 112. The digital pen 201 may include a button 201a, which is capable of being pressed, at one end portion thereof such that the digital pen 201 is easily removed from the receiving space 112 of the electronic device 101. When the button 201a is pressed, a repulsion mechanism from at least one spring that is configured to link to the button 201a acts, and the digital pen 201 may be detached from the receiving space 112.

Figure 3:
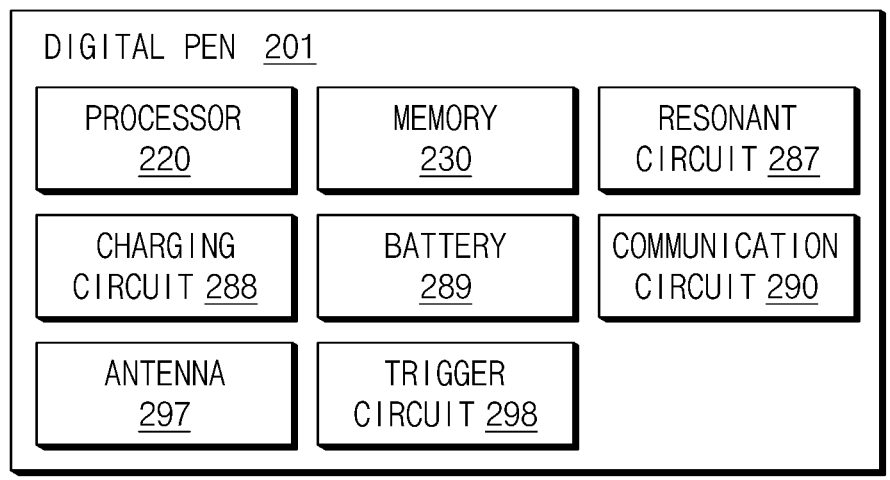
FIG. 3 illustrates a block diagram of a digital pen according to an embodiment.

FIG. 3 illustrates a block diagram of the digital pen 201 according to an embodiment.

Referring to FIG. 3, the digital pen 201 may include a processor 220, a memory 230, a resonant circuit 287, a charging circuit 288, a battery 289, a communication circuit 290, an antenna 297, and/or a trigger circuit 298. In the digital pen 201, the processor 220, at least a part of the resonant circuit 287, and/or at least a part of the communication circuit 290 may be implemented on a PCB or in the form of a chip. The processor 220, the resonant circuit 287, and/or the communication circuit 290 may be electrically connected with the memory 230, the charging circuit 288, the battery 289, the antenna 297, or the trigger circuit 298. The digital pen 201 may be implemented only with a resonant circuit and a button.

The processor 220 may include a customized hardware module or a generic processor configured to execute software and may include a hardware component (function) or a software component (program) including at least one of various sensors, a data measurement module, an input/output interface, a module to manage a state or an environment of the digital pen 201, or a communication module.

The processor 220 may include one of hardware, software, or firmware or a combination of two or more thereof, and may receive a proximity signal corresponding to an electromagnetic signal that is generated from a digitizer the electronic device 101 through the resonant circuit 287. When the proximity signal is identified, the processor 220 may control the resonant circuit 287 such that an electro-magnetic resonance (EMR) input signal is transmitted to the electronic device 101.

The memory 230 may store information about an operation of the digital pen 201. For example, the information may include information for a communication with the electronic device 101 and frequency information about an input operation of the digital pen 201.

The resonant circuit 287 may include at least one of a coil, an inductor, and a capacitor, and may be used for the digital pen 201 to generate a signal including a resonant frequency. For example, to generate a signal, the digital pen 201 may use at least one of an EMR manner, an active electrostatic (AES) manner, and an electrically coupled resonance (ECR) manner. When transmitting a signal in the EMR manner, the digital pen 201 may generate a signal including a resonant frequency, based on an electromagnetic field generated from an inductive panel of the electronic device 101. When transmitting a signal in the AES manner, the digital pen 201 may generate a signal by using the capacity coupling with the electronic device 101. When transmitting a signal in the ECR manner, the digital pen 201 may generate a signal including a resonant frequency, based on an electric field generated from a capacitive device of the electronic device 101. The resonant circuit 287 may be used to change the intensity of electromagnetic field or a frequency depending on a manipulating state of the user. For example, the resonant circuit 287 may provide a frequency for recognizing a hovering, drawing, button, or erasing input.

When the charging circuit 288 is connected with the resonant circuit 287 based on a switching circuit, the charging circuit 288 may rectify a resonance signal generated from the resonant circuit 287 to a direct current signal so as to be supplied to the battery 289. The digital pen 201 may determine whether the digital pen 201 is inserted into the electronic device 101, by using a voltage level of the direct current signal detected from the charging circuit 288.

The battery 289 may store energy necessary for an operation of the digital pen 201 and may include a lithium-ion battery or a capacitor and may be rechargeable or exchangeable. The battery 289 may be charged by using a power (e.g., a direct current signal (or a direct current power)) provided from the charging circuit 288.

The communication circuit 290 may be configured to perform a wireless communication function between the digital pen 201 and the communication module 190 of the electronic device 101, and may transmit state information and input information of the digital pen 201 to the electronic device 101 by using a short-range communication manner. For example, the communication circuit 290 may transmit motion sensor data of the digital pen 201 obtained through the trigger circuit 298, voice information input through a microphone, or level information of the battery 289. The short-range communication manner may include at least one of Bluetooth low energy (BLE) or wireless LAN.

The antenna 297 may be used to transmit a signal or a power to the outside or to receive a signal or a power from the outside. The digital pen 201 may include a plurality of antennas 297 and may select at least one antenna 297 appropriate for a communication manner from among the plurality of antennas 297. The communication circuit 290 may exchange a signal or a power with an external electronic device through the at least one antenna 297 thus selected.

The trigger circuit 298 may include at least one button or sensor circuit. The processor 220 may identify an input manner (e.g., touching or a pressing) or a type (e.g., an EMR button or a BLE button) of a button of the digital pen 201. The sensor circuit may generate an electrical signal or a data value that corresponds to an internal operation state of the digital pen 201 or corresponds to an external environment state. For example, the sensor circuit may include at least one of a motion sensor, a battery level detection sensor, a pressure sensor, a light sensor, a temperature sensor, a geomagnetic sensor, or a biometric sensor. The trigger circuit 298 may transmit a trigger signal to the electronic device 101 by using an input signal of a button or a signal through a sensor.

Figure 4:
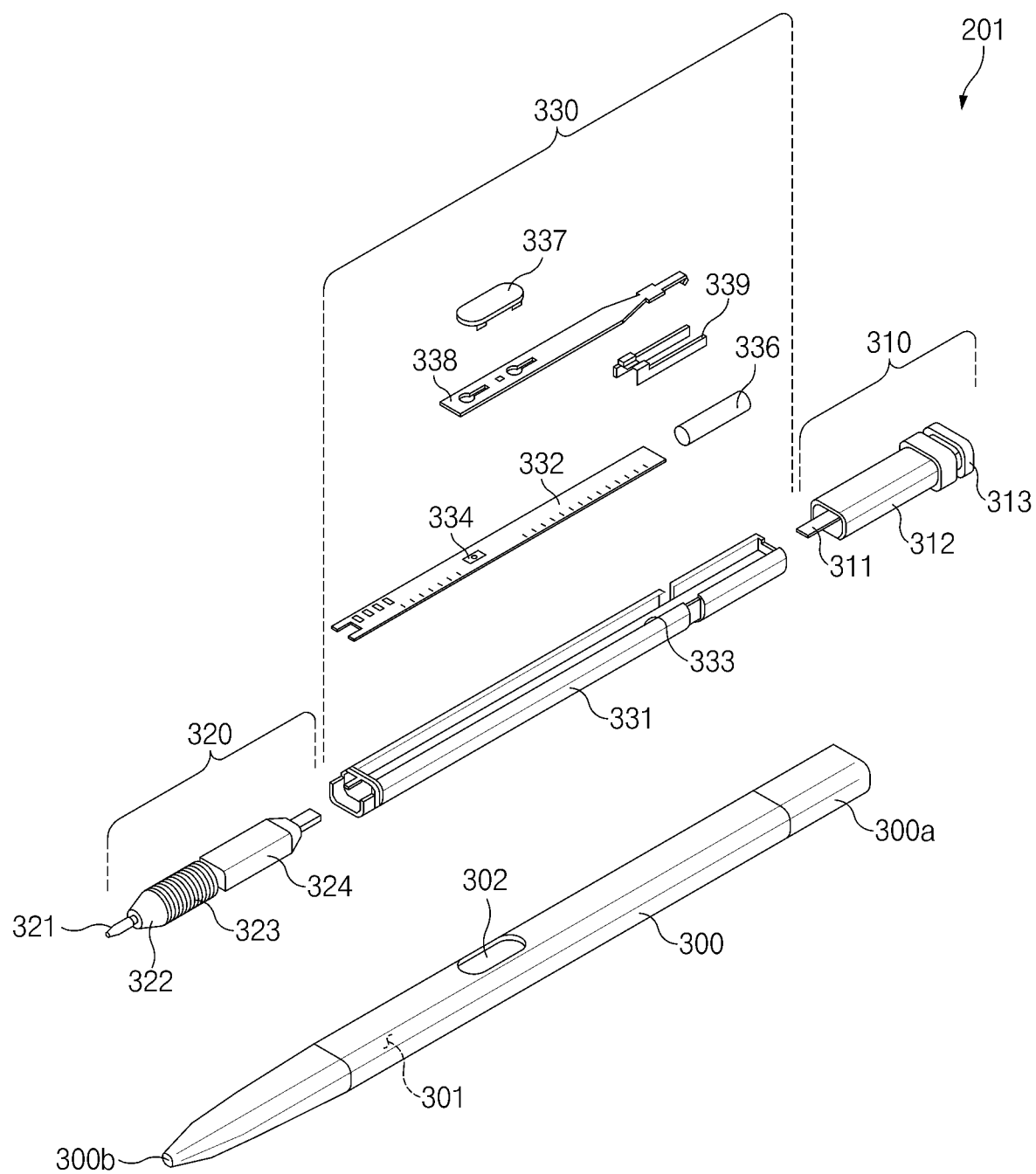
FIG. 4 is an exploded perspective view of a digital pen according to an embodiment.

FIG. 4 is an exploded perspective view of the digital pen 201 according to an embodiment.

Referring to FIG. 4, the digital pen 201 may include a pen housing 300 forming the exterior of the digital pen 201 and an inner assembly in the pen housing 300. The inner assembly may include all the parts mounted within a pen and may be inserted into the pen housing 300 by only one assembly operation.

The pen housing 300 may be elongated between a first end portion 300a and a second end portion 300b and may include the receiving space 301 therein. The pen housing 300 may have the shape of an ellipse, the cross section of which includes a short axis and a long axis and may be formed as an elliptical cylinder. A receiving space of the digital pen 201 may have an elliptic cross section corresponding to the shape of the pen housing 300. The pen housing 300 may include a synthetic resin (e.g., plastic) and/or a metallic material (e.g., aluminum). The second end portion 300b of the pen housing 300 may be formed of a synthetic resin material.

The inner assembly may have an elongated shape corresponding to the shape of the pen housing 300, and may be roughly divided into three components along a longitudinal direction. For example, the inner assembly may include an ejection member 310 disposed at a location corresponding to the first end portion 300a of the pen housing 300, a coil part 320 disposed at a location corresponding to the second end portion 300b of the pen housing 300, and a circuit board part 330 disposed at a location corresponding to a body of a housing.

The ejection member 310 may include a component for removing the digital pen 201 from the receiving space 112 of the electronic device 101, and may include a shaft 311, and an ejection body 312 and a button part 313 disposed around the shaft 311 and forming the overall exterior of the ejection member 310. When the inner assembly is completely inserted into the pen housing 300, the part of the ejection member 310, which includes the shaft 311 and the ejection body 312, may be surrounded by the first end portion 300a of the pen housing 300, and the button part 313 may be exposed to the outside of the first end portion 300a. A plurality of cam members or elastic members may be disposed in the ejection body 312 to form a push-pull structure. The button part 313 may be substantially engaged with the shaft 311 to reciprocate linearly with respect to the ejection body 312, and may include a button having a stopper structure that enables the user to remove the digital pen 201 by using his/her nail. The digital pen 201 may include a sensor detecting a linear reciprocating motion of the shaft 311, thus providing another input manner.

The coil part 320 may include a pen tip 321 exposed to the outside of the second end portion 300b when the inner assembly is inserted into the pen housing 300, a packing ring 322, a coil 323 having a plurality of turns, and/or a pen pressure sensing unit 324 for obtaining a change in pressure when the pen tip 321 is pressed. The packing ring 322 may include epoxy, rubber, urethane, or silicon, may be provided for waterproofing and dustproofing, and may protect the coil part 320 and the circuit board part 330 from moisture when the electronic device 101 and/or the digital pen 201 are infiltrated into water or from dust. The coil 323 may form a resonant frequency in a given frequency band (e.g., 500 kHz), and may be combined with at least one element (e.g., a capacitor) to adjust the resonant frequency formed by the coil 323 within a given range.

The circuit board part 330 may include a printed circuit board 332, a base 331 covering at least one surface of the printed circuit board 332, and an antenna. A substrate seating part 333, on which the printed circuit board 332 is disposed, may be formed on an upper surface of the base 331, and the printed circuit board 332 may be seated on the substrate seating part 333. The printed circuit board 332 may include an upper surface and a lower surface. A variable capacitor connected with the coil 323 or a switch 334 may be disposed on the upper surface, and a charging circuitry, a battery, or a communication circuitry may be disposed on the lower surface. The battery may include an electric double layered capacitor (EDLC). The charging circuitry is interposed between the coil 323 and the battery and may include a voltage detector circuitry and a rectifier.

The antenna may include an antenna structure 339 that is exemplified as illustrated in FIG. 4 and/or an antenna that is embedded in the printed circuit board 332. The switch 334 may be provided on the printed circuit board 332. A side button 337 that is provided on the digital pen 201 may be used to press the switch 334 and may be exposed to the outside through a side opening 302 of the pen housing 300. The side button 337 may be supported by a supporting member 338. When there is no external force acting on the side button 337, the supporting member 338 may provide a restoring force such that the side button 337 is returned to or maintained at a specific location.

The circuit board part 330 may include a different packing ring such as an O-ring. For example, O-rings that are formed of an elastic material may be disposed at opposite ends of the base 331 to form a sealing structure between the base 331 and the pen housing 300. The supporting member 338 may be partially in close contact with an inner wall of the pen housing 300 around the side opening 302 to form a sealing structure. As in the packing ring 322 of the coil part 320, the circuit board part 330 may have a waterproof and dustproof structure.

The digital pen 201 may include a battery mounting part provided on the upper surface of the base 331 such that a battery 336 is disposed in the battery mounting part 335. The battery 336 that is able to be mounted on the battery mounting part 335 may include a cylinder-type battery.

The digital pen 201 may include a microphone, which may be directly connected with the printed circuit board 332, may be connected with a separate flexible printed circuit board (FPCB) connected with the printed circuit board 332, or may be disposed parallel to the side button 337 in the longitudinal direction of the digital pen 201.

Figure 5:
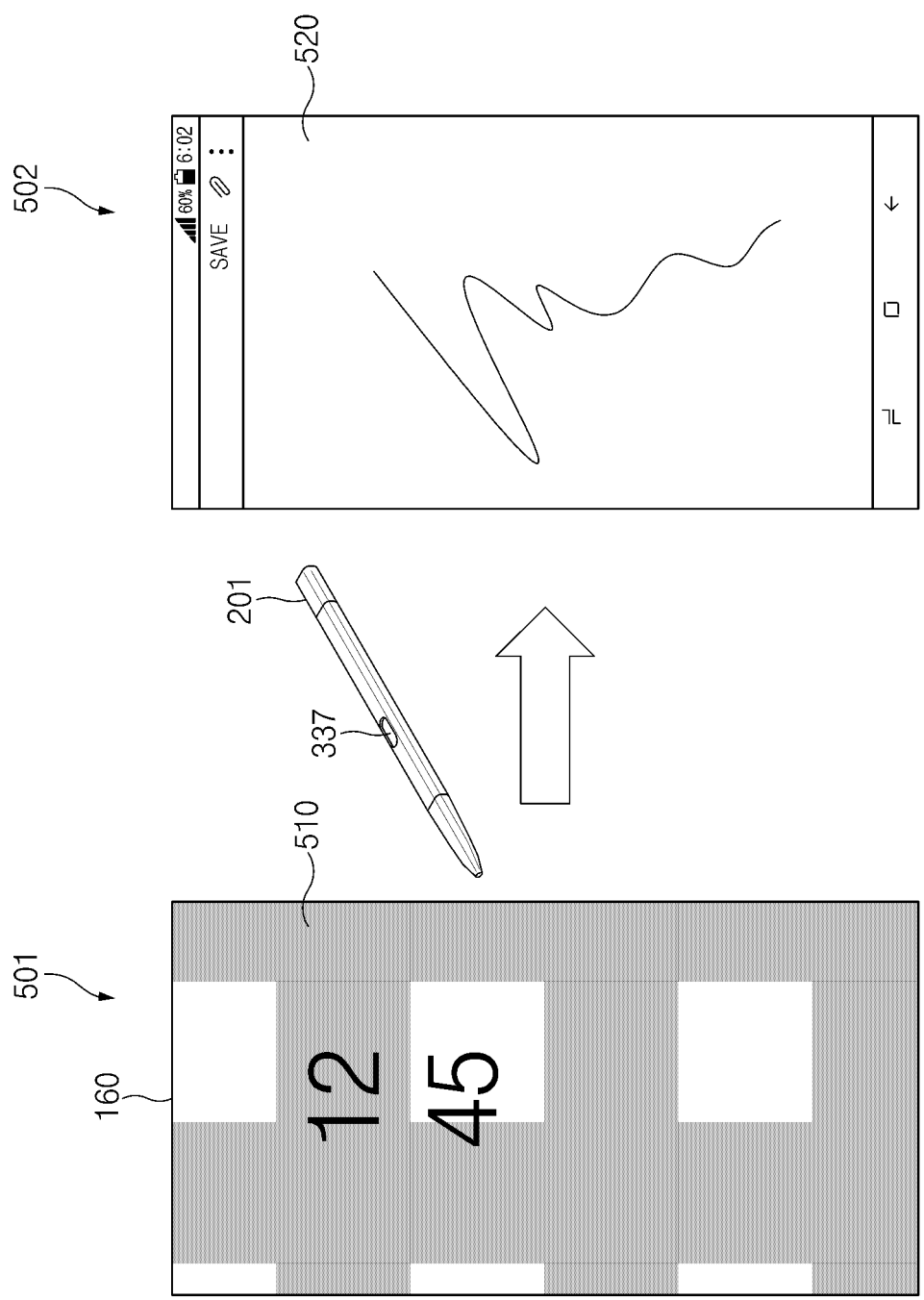
FIG. 5 illustrates an unlock operation using a digital pen according to an embodiment.

FIG. 5 illustrates an unlocking operation using the digital pen 201 according to an embodiment.

Referring to FIG. 5, in a lock state illustrated in screenshot 501 (or a sleep state), the electronic device 101 may display a first screen 510 through at least part of the display device 160. The first screen 510 may be a lock screen or an always on display (AOD) screen. In the lock state in screenshot 501, the electronic device 101 may enable a screen of the display 160 to be turned off.

The electronic device 101 may receive a user input through the digital pen 201 in the lock state in screenshot 501. For example, the digital pen 201 may receive a user input through a side button 337 when the electronic device 101 is connected with the digital pen 201 based on the short-range wireless communication protocol. The digital pen 201 may transmit the received user input to the electronic device 101 based on the short-range wireless communication protocol, which may be based on the Bluetooth™ standard or the Bluetooth low energy (BLE) standard defined by the Bluetooth special interest group (SIG).

The digital pen 201 detached from the electronic device 101 may be lost. A third party that recovers the lost digital pen 201 may change a state of the electronic device 101 to an unlock state in screenshot 502 by using the digital pen 201. To prevent the third party from unlocking the electronic device 101, the electronic device 101 may change the state of the electronic device 101 to the unlock state in screenshot 502 based on at least one of the below three conditions, as well as the user input through the user interface of the digital pen 201. For example, the electronic device 101 may change the state of the electronic device 101 based on at least one of whether: (1) the digital pen 201 is detached, (2) there is a history in which the electronic device 101 is unlocked through a user authentication method (or an unlock history by the user authentication method), and (3) an unlock function is set by the digital pen 201.

The user authentication method of condition (2) may include at least one of, but is not limited to, recognition of biometric information including at least one of fingerprint information or iris information, a password input, a personal information number (PIN), or a pattern input. The electronic device 101 may consider all or at least one of the three conditions. An embodiment associated with condition (1) will be described with reference to FIGS. 6 and 7, embodiment associated with condition (2) will be described with reference to FIGS. 8 and 9, and an embodiment associated with condition (3) will be described with reference to FIGS. 14 and 15.

The electronic device 101 may change the state of the electronic device 101 from the lock state in screenshot 501 to the unlock state in screenshot 502 based on the user input through the user interface of the digital pen 201 and at least one of the above three conditions. In the unlock state in screenshot 502, the electronic device 101 may display a second screen 520, which may include a screen in which an application (e.g. note application or memo application) is executed. The second screen 520 may include a screen before the state of the electronic device 101 is changed to the lock state in screenshot 501. The second screen 520 may include a home screen.

Figure 6:
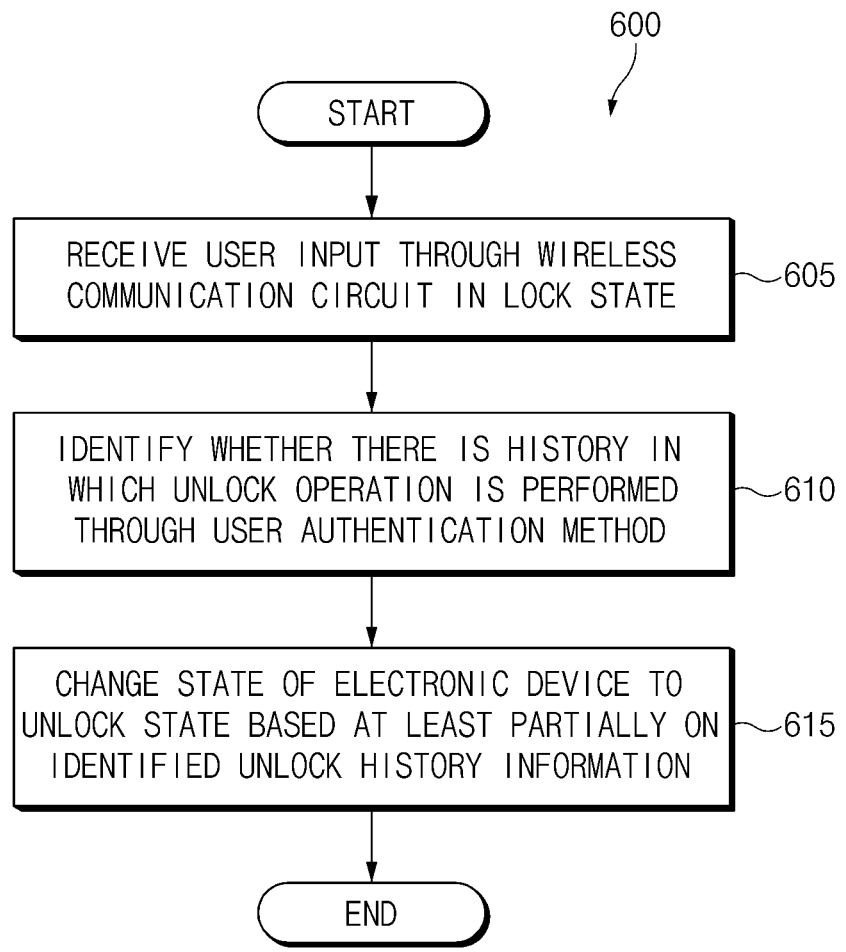
FIG. 6 illustrates a flowchart of an electronic device performing an unlock operation by using a digital pen according to an embodiment.

FIG. 6 illustrates a flowchart 600 of the electronic device 101 performing an unlock operation by using the digital pen 201 according to an embodiment. Operations that are illustrated in FIG. 6 or another operation flowchart may be performed by the electronic device 101 or a component of the electronic device 101, such as at least one of a hardware component (e.g., the processor 120) or a software component (e.g., the application layer 146 or the middleware 144) among the components illustrated in FIG. 1.

Referring to FIG. 6, in step 605, the electronic device 101 may receive a user input through a wireless communication circuit in a lock state. For example, when a user input pressing the side button 337 of the digital pen 201 is received, the digital pen 201 may transmit a signal, which is based on the short-range wireless communication protocol, to the electronic device 101, which may receive the signal transmitted from the digital pen 201 through a wireless communication circuit.

In step 610, the electronic device 101 may identify whether there is a history in which an unlock operation is performed through the user authentication method. For example, the electronic device 101 may identify whether there is unlock history, through unlock history information stored in a memory of the electronic device 101. For example, when the unlock operation is performed at least once through the user authentication method after the digital pen 201 is detached from the electronic device 101, the unlock history information may indicate that there is unlock history and the electronic device 101 may determine that the unlock history exists. When the digital pen 201 is detached from the receiving space 112 of the electronic device 101 in the unlock state in screenshot 502, the unlock history information may indicate that there is unlock history and the electronic device 101 may determine that the unlock history exists.

When the unlock history exists consistently, because a third party recovering the digital pen 201 may unlock the electronic device 101, the electronic device 101 may change (or initialize) the unlock history information to a state where there is no unlock history, when at least one of the following conditions is satisfied: A) the digital pen 201 is inserted into the electronic device 101, B) the electronic device 101 moves as much as a specified distance or farther after the digital pen 201 is detached, and C) a short-range wireless communication-based link between the electronic device 101 and the digital pen 201 is released.

In step 615, the electronic device 101 may change the state of the electronic device 101 to the unlock state in screenshot 502 based at least partially on the identified unlock history information.

Figure 7:
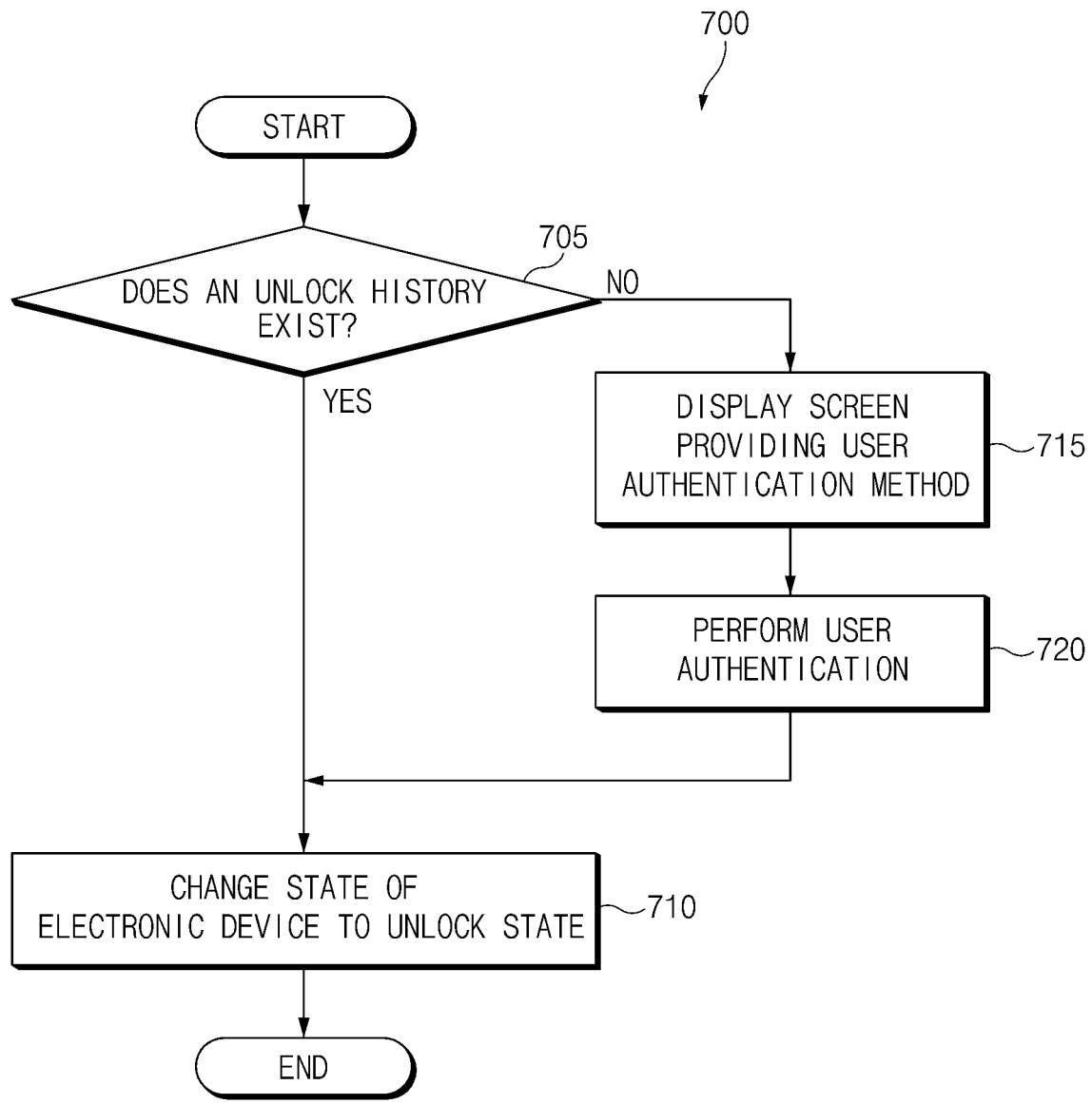
FIG. 7 illustrates a flowchart of an electronic device providing a user authentication method according to an embodiment.

FIG. 7 illustrates a flowchart 700 of the electronic device 101 providing a user authentication method according to an embodiment. Operations illustrated in FIG. 7 may correspond to steps 610 and 0 615 of FIG. 6.

Referring to FIG. 7, in step 705, the electronic device 101 may identify whether an unlock history exists, in response to receiving a user input through a user interface of the digital pen 201. When the unlock history exists, in step 710, the electronic device 101 may change a state of the electronic device 101 from the lock state to the unlock state.

When the unlock history does not exist, in step 715, the electronic device 101 may display a screen providing the user authentication method for an unlock operation through the display. For example, the electronic device 101 may display a screen providing a guide so as to input at least one of biometric information, a password, a PIN, or a pattern.

In step 720, the electronic device 101 may perform user authentication through the user authentication method, and the electronic device 101 may change the state of the electronic device 101 to the unlock state in step 710.

Figure 8:
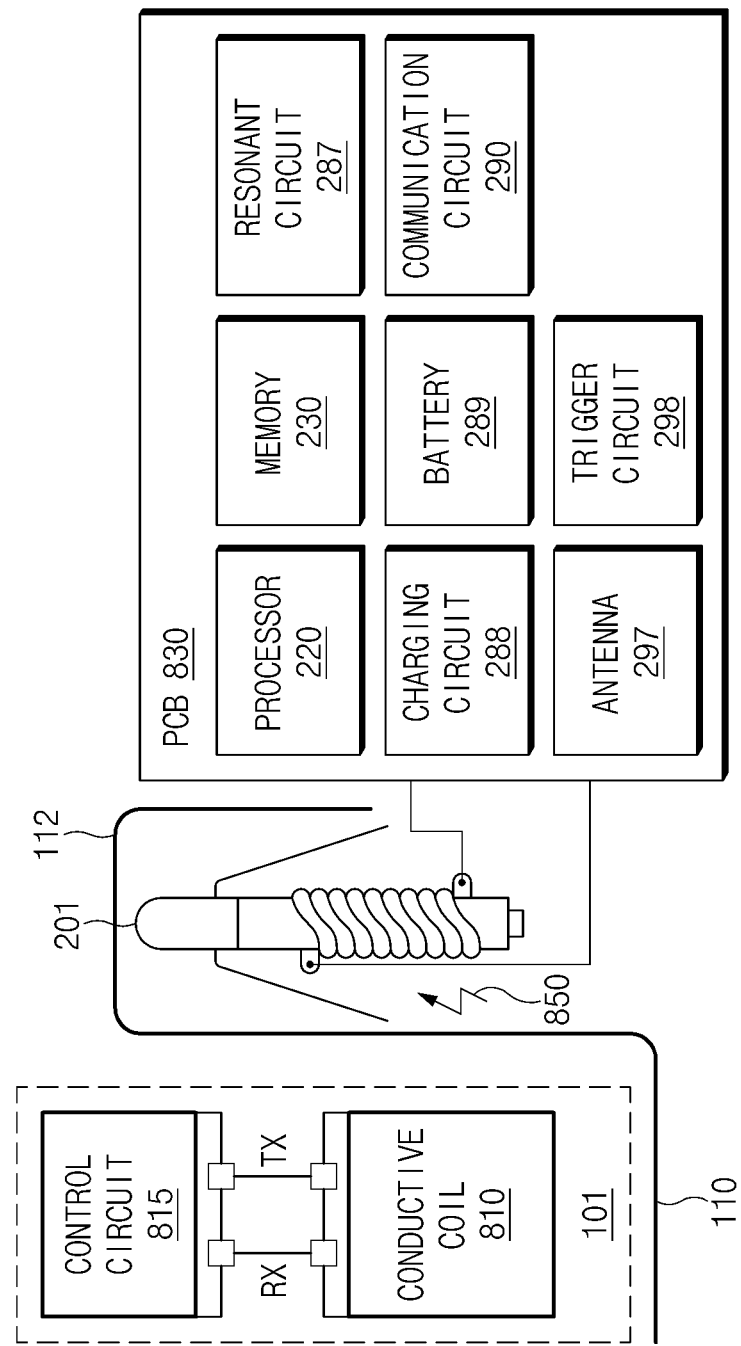
FIG. 8 illustrates an operation of an electronic device detecting whether a digital pen is detached, according to an embodiment.

FIG. 8 illustrates an operation of the electronic device 101 detecting whether the digital pen 201 is detached, according to an embodiment.

Referring to FIG. 8, the electronic device 101 may further include a conductive coil 810 and a control circuit 815 to detect the digital pen 201 inserted into the receiving space 112.

The conductive coil 810 may perform an antenna function of transmitting/receiving a signal that is based on the electromagnetic induction manner (e.g., EMR, AES, or ECR), and may be disposed within the housing 110 or the receiving space 112.

The control circuit 815 may generate a signal that is based on the electromagnetic induction manner or may process (or analyze) a received signal, and may be at least a part of the processor 120 or may be a separate module (or chip).

The electronic device 101 may detect whether the digital pen 201 is detached, through a signal 850 based on the electromagnetic induction manner. For example, the electronic device 101 may generate a signal of a specified frequency through the control circuit 815 and may transmit the generated signal through the conductive coil 810, which signal may be induced by the resonant circuit 287 mounted on a PCB 830 of the digital pen 201. The electronic device 101 may receive the signal induced through the conductive coil 810 and may identify whether the digital pen 201 is inserted into or detached from the receiving space 112, by analyzing (or processing) the signal induced through the control circuit 815.

The electronic device 101 may receive information about the digital pen 201 through the signal 850 that is based on the electromagnetic induction manner. The information may include at least one of a list of applications that support a user input through a user interface of the digital pen 201, and graphic user interface (GUI) information indicating whether a user input through the user interface of the digital pen 201 is supported.

Figure 9:
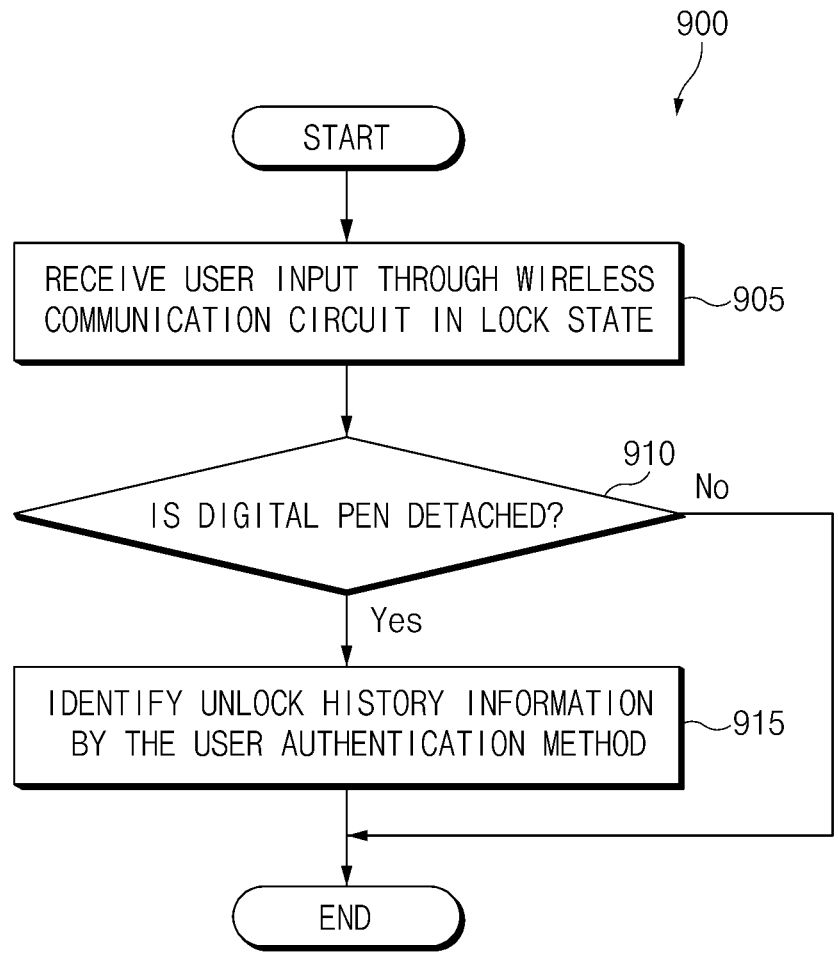
FIG. 9 illustrates a flowchart of an electronic device detecting whether a digital pen is detached, according to an embodiment.

FIG. 9 illustrates a flowchart 900 of the electronic device 101 detecting whether the digital pen 201 is detached, according to an embodiment.

Referring to FIG. 9, in step 905, the electronic device 101 may receive a user input through a wireless communication circuit of the digital pen 201 in the lock state.

In step 910, the electronic device 101 may identify whether the digital pen 201 is detached, in response to receiving the user input. For example, the electronic device 101 may identify whether the digital pen 201 is inserted into the receiving space 112, by using the control circuit 815 and the conductive coil 810 of FIG. 8. When the digital pen 201 is not in a detached state, the electronic device 101 may terminate the algorithm. The electronic device 101 may display a screen providing the user authentication method before terminating the algorithm and may perform user authentication based on the displayed screen.

When the digital pen 201 is in the detached state, in step 915, the electronic device 101 may identify unlock history information by the user authentication method.

Figure 10A:
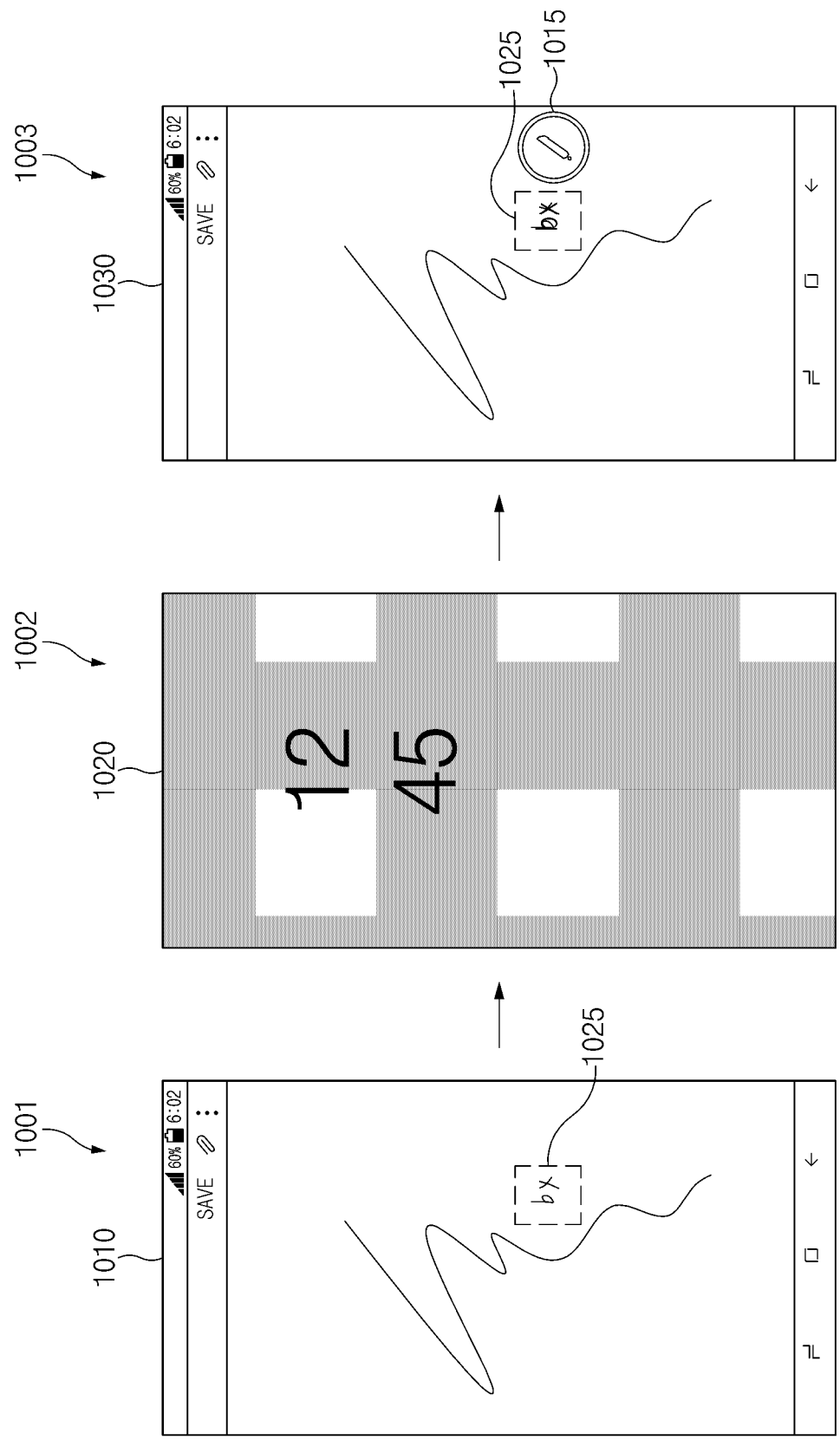
FIGS. 10A and 10B illustrate an operation of an electronic device displaying a screen after an unlock operation according to an embodiment.
Figure 10B:
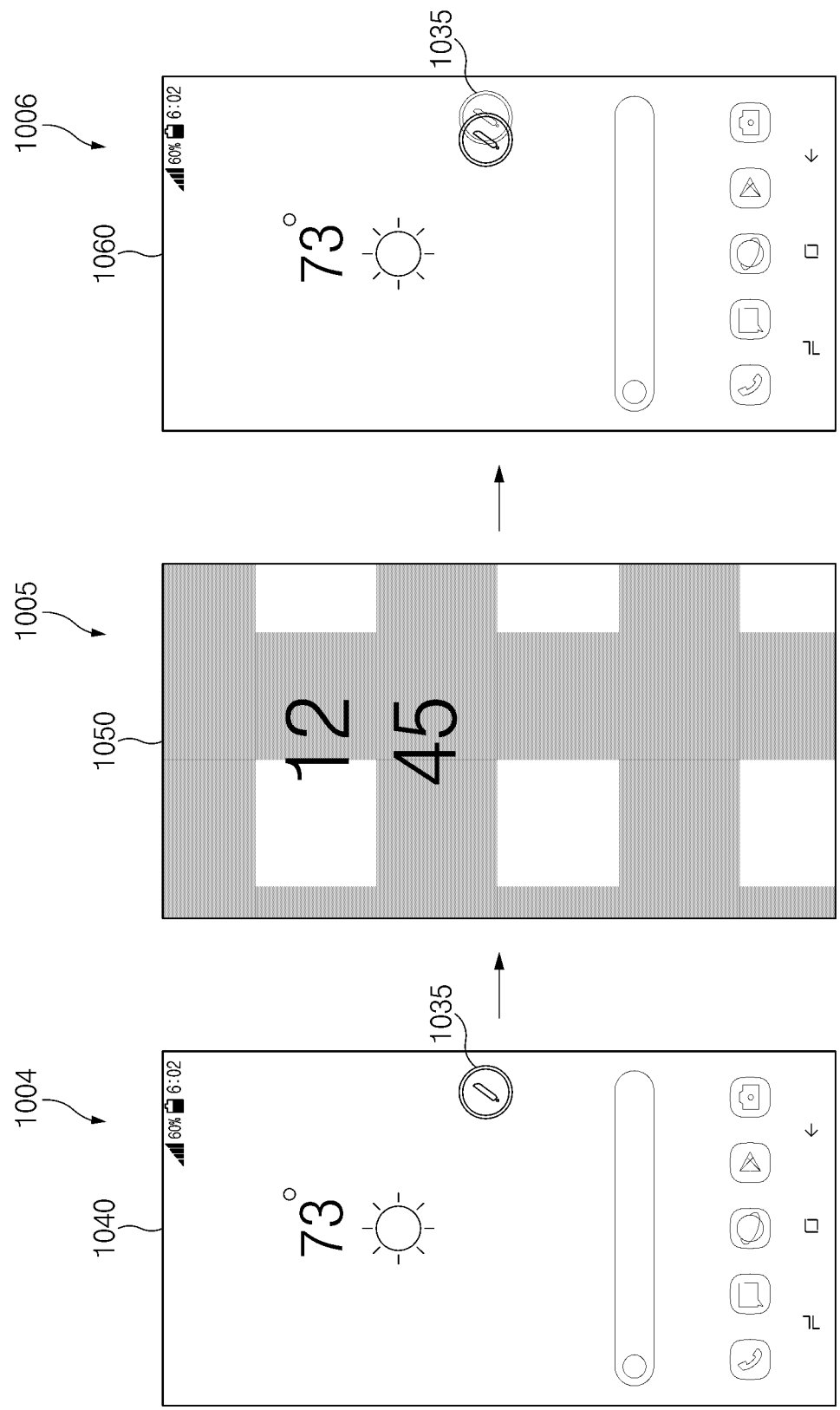

FIGS. 10A and 10B illustrate an operation of the electronic device 101 displaying a screen 1003 after an unlock operation according to an embodiment. FIG. 10A shows an embodiment in which an execution screen of an application supporting a user input through a user interface of the digital pen 201 is displayed after an unlock operation, and FIG. 10B shows an embodiment in which an execution screen of an application not supporting a user input through the user interface of the digital pen 201 is displayed after an unlock operation.

Referring to FIG. 10A, the electronic device 101 may display a first screen 1010 through a display in an unlock state 1001. For example, the first screen 1010 may indicate an execution screen of an application (or an application program) (e.g., a memo application or a note application) supporting a user input through the digital pen 201.

When there is no user input during a specified time after the first screen 1010 is displayed or depending on a user input changing a state of the electronic device 101 to a lock state 1002, the electronic device 101 may change the state of the electronic device 101 from the unlock state 1001 to the lock state 1002. In the lock state 1002, the electronic device 101 may display a second screen 1020 which may include a lock screen or an AOD screen. The electronic device 101 may enable a screen of a display to be turned off in the lock state 1002.

The electronic device 101 may change the state of the electronic device 101 from an unlock state 1003 based on a user input through a user interface of the digital pen 201. The electronic device 101 may display a third screen 1030 in the unlock state 1003. The third screen 1030 may include an execution screen of an application that is executed in the unlock state 1001 before the lock state 1002. For example, the third screen 1030 may include substantially the same screen as the first screen 1010 displayed in the unlock state 1001.

The electronic device 101 may display a first GUI 1015 indicating that an input through the side button 337 of the digital pen 201 is able to be supported in the third screen 1030. The first GUI 1015 may be displayed in one area, such as on one side of the third screen 1030.

To provide continuity of use of the digital pen 201, the electronic device 101 may highlight a character or a stroke input in a first area 1025, shown as "bx", which is input most recently in the unlock state 1001, in the third screen 1030 in bold type or with another color. For example, the electronic device 101 may identify information about at least one of the number of strokes (or characters) input before the state of the electronic device 101 is changed from the unlock state 1001 to the lock state 1002, a time when the strokes are input, or the order of receiving the strokes. When the state of the electronic device 101 is changed from the lock state 1002 to the unlock state 1003, the electronic device 101 may highlight a stroke or character, which is determined based on the identified information, in the third screen 1030.

Referring to FIG. 10B, the electronic device 101 may display a first screen 1040 in an unlock state 1004. The first screen 1040 may include an execution screen of an application not supporting a user input through the user interface of the digital pen 201, or a home screen. The electronic device 101 may display a second GUI 1035 indicating that a user input through the side button 337 of the digital pen 201 is not supported, in the first screen 1040. A shape of the second GUI 1035 may be different from a shape of the first GUI 1015 of FIG. 10A. For example, the second GUI 1035 may be displayed to be more blurred than the first GUI 1015, to be smaller than the first GUI 1015, or to be transparent.

When there is no user input during a specified time or depending on a user input changing the state of the electronic device 101 to a lock state 1005, the electronic device 101 may change the state of the electronic device 101 from the unlock state 1004 to the lock state 1005, in which the electronic device 101 may display a second screen 1050 (e.g., the second screen 1020 of FIG. 10A).

The electronic device 101 may change the state of the electronic device 101 from an unlock state 1006 based on a user input through the user interface of the digital pen 201. The electronic device 101 may display a third screen 1060 in the unlock state 1006. The third screen 1060 may include substantially the same screen as an execution screen of an application or a home screen displayed in the unlock state 1004.

The electronic device 101 may display the second GUI 1035 in the third screen 1060. To emphasize a display of the second GUI 1035 after the state of the electronic device 101 is changed to the unlock state 1006, the electronic device 101 may enable the second GUI 1035 to have the effect in which the second GUI 1035 shakes on the third screen 1060.

Figure 11:
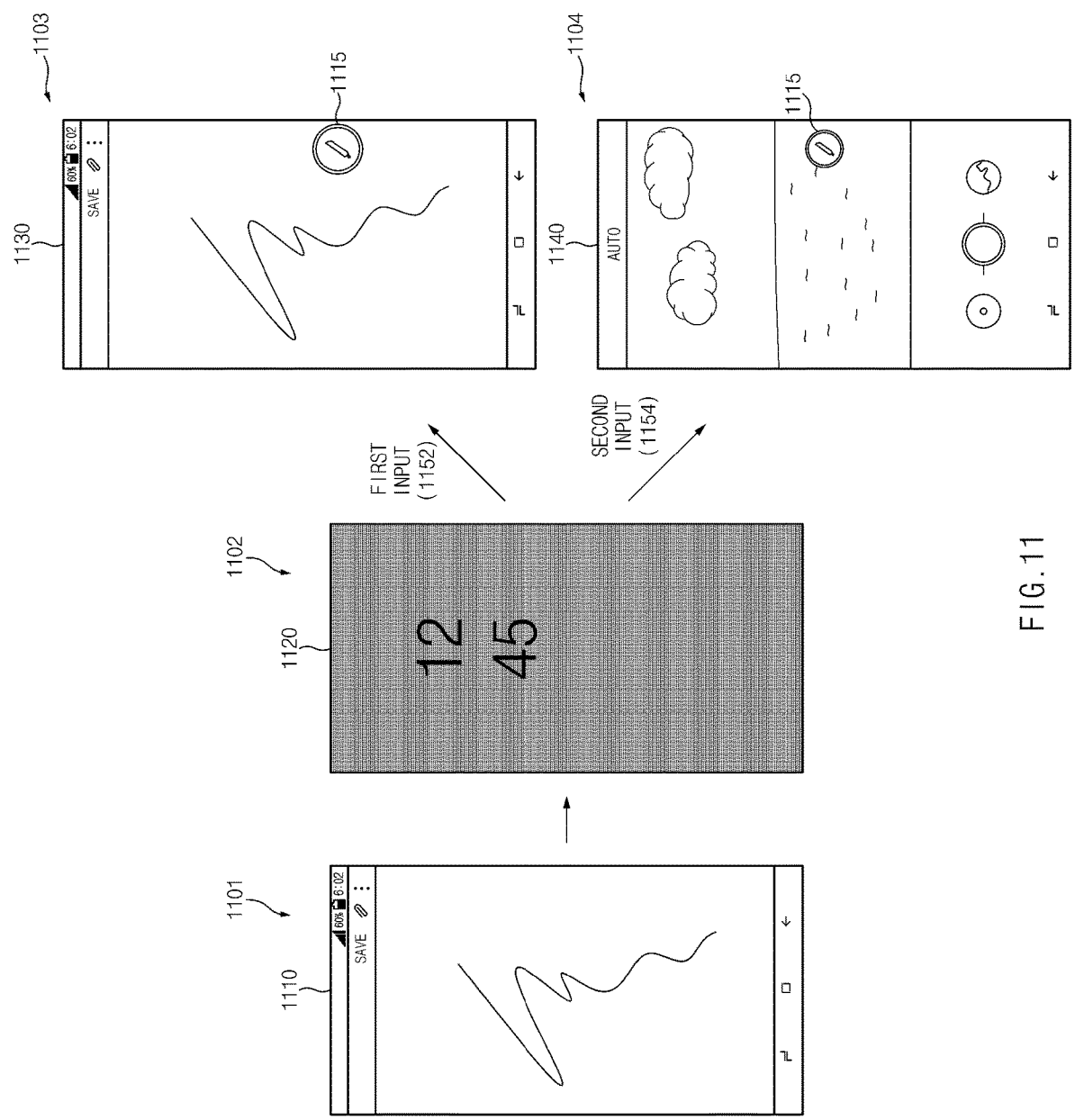
FIG. 11 illustrates an operation of an electronic device displaying a screen based on a type of a user input through a user interface of a digital pen according to an embodiment.

FIG. 11 illustrates an operation of an electronic device displaying a screen based on a type of a user input through a user interface of the digital pen 201 according to an embodiment.

Referring to FIG. 11, the electronic device 101 may display a first screen 1110 through a display in an unlock state 1101. The first screen 1110 may indicate a screen of an application being executed by the electronic device 101 (or a home screen). When there is no user input during a specified time or depending on a user input changing a state of the electronic device 101 to a lock state 1102, the electronic device 101 may change the state of the electronic device 101 from the unlock state 1101 to the lock state 1102. In the lock state 1102, the electronic device 101 may display a second screen 1120 which may include a lock screen or an AOD screen. For another example, the electronic device 101 may enable a screen of a display to be turned off in the lock state 1102.

The electronic device 101 may execute another application based on a type of a user input received from the digital pen 201 in the lock state 1102. The type of the user input may be based on at least one of the number of times that the user presses a user interface of the digital pen 201 and a time when the user presses the user interface. For example, the input by which the user presses the user interface of the digital pen 201 during less than a specified time may be referred to as a "first input 1152 (or a single press or a double press)". The input by which the user presses the user interface of the digital pen 201 during the specified time or more may be referred to as a "second input 1154 (or a long press)".

When the first input 1152 is received in the lock state 1102, the electronic device 101 may change the state of the electronic device 101 to an unlock state 1103 and may display an execution screen of an application executed in an unlock state 1101 before the lock state 1102. The electronic device 101 may display a third screen 1130 that is substantially the same as the first screen 1110 displayed in the unlock state 1101 before the lock state 1102. The electronic device 101 may display the first GUI 1015 indicating that an input through the user interface of the digital pen 201 is able to be supported in the third screen 1130.

When the second input 1154 is received in the lock state 1102, the electronic device 101 may execute an application supporting the second input 1154 without considering the application executed in an unlock state 1101 before the lock state 1102. The application supporting the second input 1154 may include a camera application. The electronic device 101 may display a fourth screen 1140 including the execution screen of the application supporting the second input 1154. The application supporting the second input 1154 may require an unlock operation or may not require the unlock operation. For example, when the camera application does not require the unlock operation, the electronic device 101 may display the fourth screen 1140 in the lock state 1102.

Figure 12:
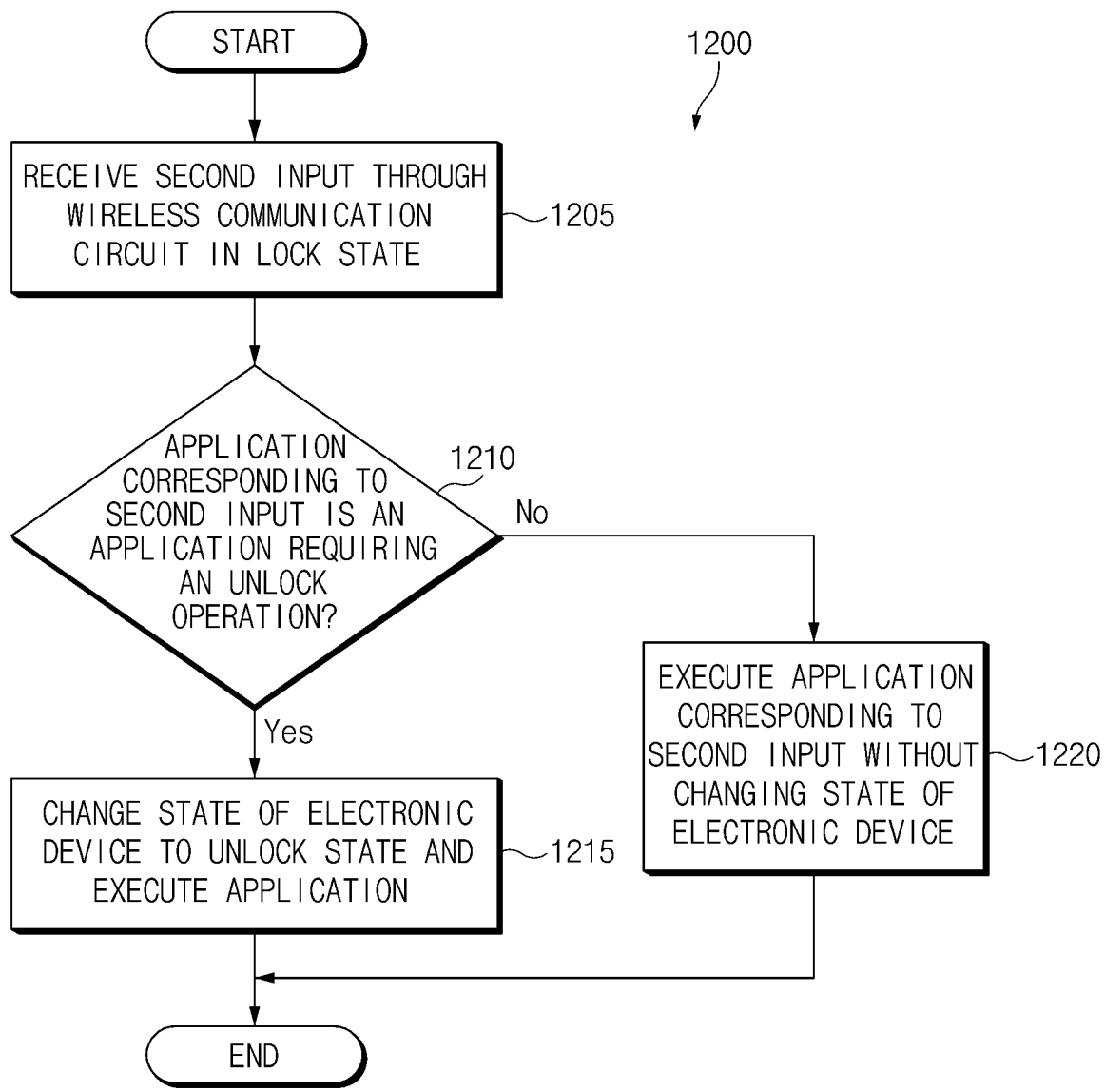
FIG. 12 illustrates a flowchart of an electronic device displaying a screen based on a second input according to an embodiment.

FIG. 12 illustrates a flowchart 1200 of the electronic device 101 displaying a screen based on the second input 1154 according to an embodiment.

Referring to FIG. 12, in step 1205, the electronic device 101 may receive the second input 1154 from the digital pen 201 through a wireless communication circuit in a lock state.

In step 1210, the electronic device 101 may identify whether an application corresponding to the second input 1154 requires an unlock operation. A first application that requires the unlock operation may include a memo application or a note application. A second application that does not require the unlock operation may include a camera application.

When the application corresponding to the second input 1154 requires the unlock operation (e.g., when the application corresponding to the second input 1154 is the first application), in step 1215, the electronic device 101 may change a state of the electronic device 101 to an unlock state and may execute the application corresponding to the second input 1154.

When the application corresponding to the second input 1154 does not require the unlock operation (e.g., when the application corresponding to the second input 1154 is the second application), in step 1220, the electronic device 101 may execute the application corresponding to the second input 1154 without changing the state of the electronic device 101 to the unlock state.

Figure 13:
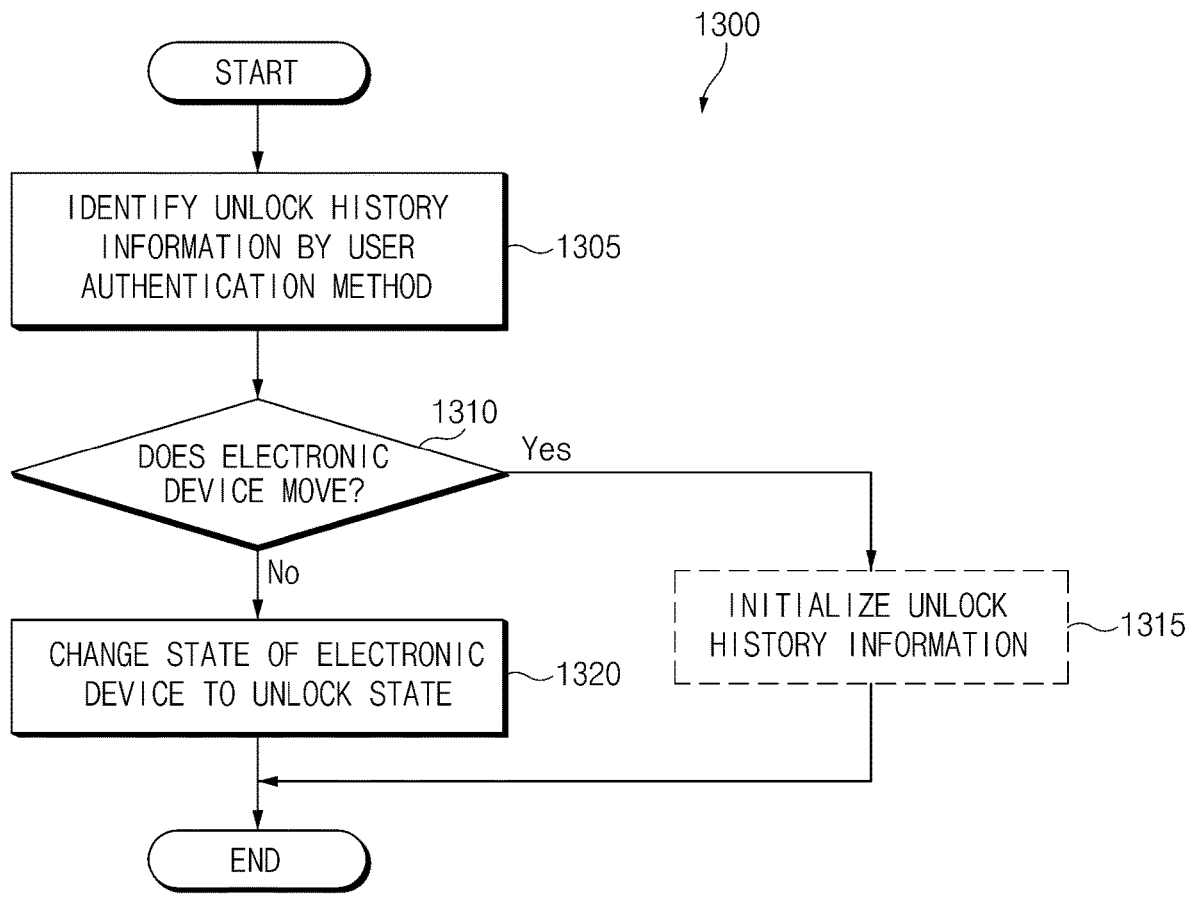
FIG. 13 illustrates a flowchart of an electronic device identifying movement of an electronic device according to an embodiment.

FIG. 13 illustrates a flowchart 1300 of the electronic device 101 identifying the movement of the electronic device 101 according to an embodiment.

The digital pen 201 may be lost while being detached from the electronic device 101. To account for the loss of the digital pen 201, the electronic device 101 may change a state of the electronic device 101 or unlock history information, depending on the movement of the electronic device 101 identified after the digital pen 201 is detached.

Referring to FIG. 13, after the electronic device 101 identifies unlock history information by the user authentication method in step 1305, in step 1310, the electronic device 101 may identify whether the electronic device 101 moves, such as by a specified distance or farther, through a motion sensor included in the electronic device 101. Information about the movement of the electronic device 101 may be stored in a memory 130 of the electronic device 101. When a state of the electronic device 101 is changed to an unlock state or the digital pen 201 is inserted into the electronic device 101, the information about the movement may be initialized.

That the electronic device 101 moves as much as the specified distance or farther may indicate that the digital pen 201 is apart from the electronic device 101 as much as the specified distance or farther. In this case, the electronic device 101 may terminate the algorithm without changing a lock state of the electronic device 101.

In step 1315 before the electronic device 101 terminates the algorithm, the electronic device 101 may initialize the unlock history information so as to indicate that there is no unlock history. For example, when there is detected the event that the electronic device 101 moves as much as the specified distance or farther, the electronic device 101 may perform an unlock operation using the user authentication method. When the state of the electronic device 101 is changed to the unlock state, the electronic device 101 may initialize the unlock history information.

When the electronic device 101 moves as much as the specified distance or farther, the electronic device 101 may display a screen associated with the loss of the digital pen 201 through a display and may release a short-range wireless communication link with the digital pen 201. When the short-range wireless communication link is released, the electronic device 101 may display a screen indicating a lock state. To re-establish a short-range wireless communication protocol-based link with the digital pen 201, the electronic device 101 may output a UI guiding the user so as to insert the digital pen 201 into the receiving space 112. For example, the electronic device 101 may output at least one of a GUI, a sound, or a vibration.

When the electronic device 101 does not move as much as the specified distance or farther, in step 1320, the electronic device 101 may change the state of the electronic device 101 to the unlock state.

Figure 14:
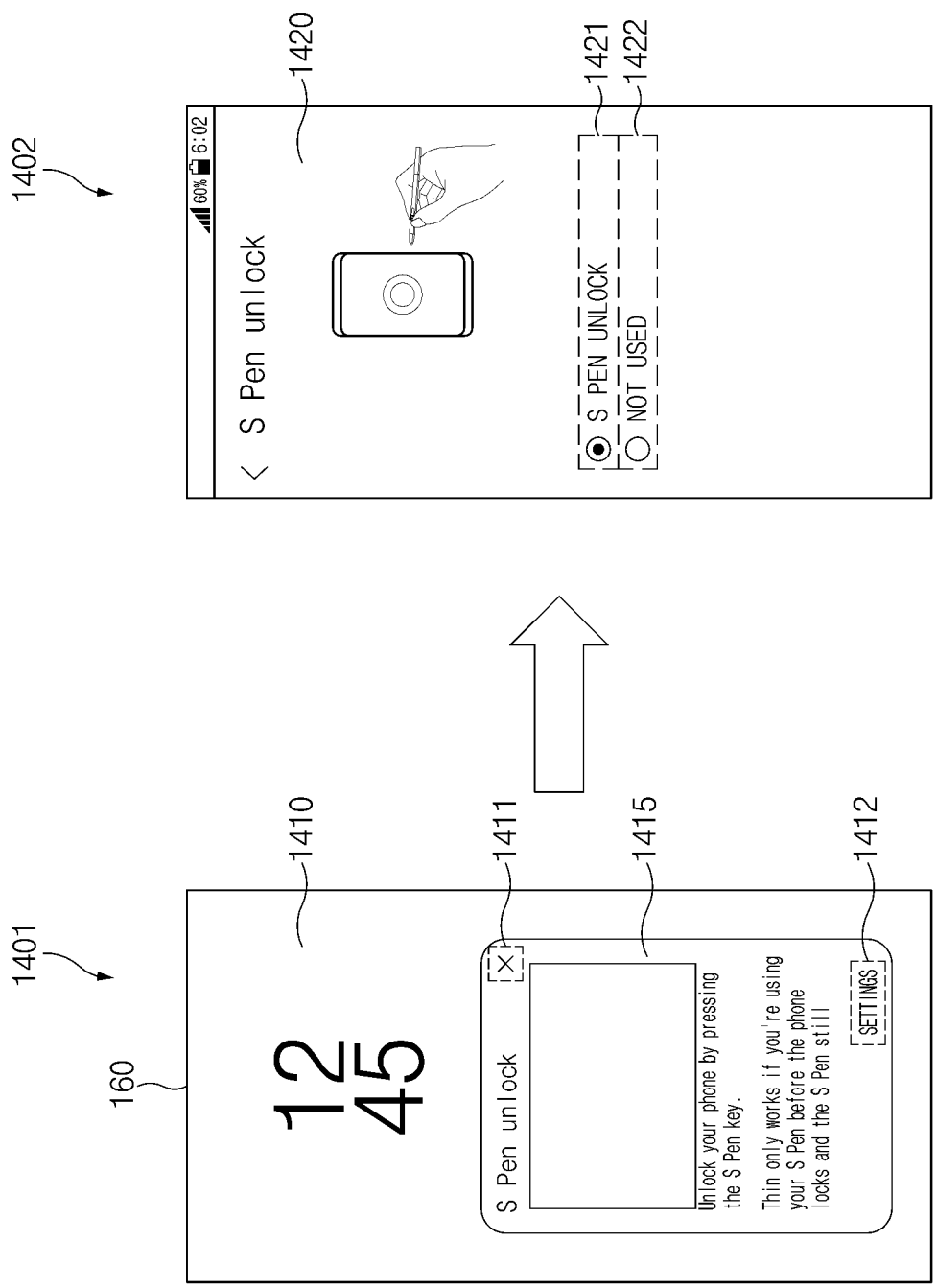
FIG. 14 illustrates an operation of setting an unlock function of an electronic device according to an embodiment.

FIG. 14 illustrates an operation of setting an unlock function of an electronic device according to an embodiment.

The electronic device 101 may activate a pen unlock function in which a state of the electronic device 101 is changed based on a user input through a user interface of the digital pen 201, depending on user settings. For example, the electronic device 101 may activate the pen unlock function to provide continuity of use of the digital pen 201 and may deactivate the pen unlock function to prevent a third party from unlocking the electronic device 101.

Referring to FIG. 14, in screenshot 1401, the electronic device 101 may provide a GUI 1415, which provides a guide so as to set the pen unlock function, to the user through the display 160. The GUI 1415 may be displayed as a pop-up in a partial area of a first screen 1410. The electronic device 101 may change the first screen 1410 to a separate screen including the GUI 1415.

When a user input is received through a user interface of the digital pen 201 while the electronic device 101 operates in a lock state and the pen unlock function is deactivated, the electronic device 101 may display the GUI 1415 to provide a guide so as to set the pen unlock function.

The electronic device 101 may display the GUI 1415 in response to detecting that the digital pen 201 is detached. In this case, to prevent an inconvenience due to the frequent display of the GUI 1415, the electronic device 101 may not display the GUI 1415 when a specified condition is satisfied even though the digital pen 201 is detached. For example, when there is a history in which a first button 1411 dismissing the GUI 1415 is selected after the GUI 1415 is displayed, when there is a history in which a second button 1412 for entering a screen 1420 setting the pen unlock function in the GUI 1415 is selected, or in which the pen unlock function is activated at least once, the electronic device 101 may not display the GUI 1415 even though the digital pen 201 is detached.

When the second button 1412 for entering the screen 1420 setting the pen unlock function is selected in the GUI 1415, in screenshot 1402, the electronic device 101 may display the screen 1420 setting the pen unlock function through the display 160. When there is received an input selecting a button 1421 activating the pen unlock function from among buttons 1421 and 1422 included in the screen 1420 setting the pen unlock function, the electronic device 101 may activate the pen unlock function.

Figure 15:
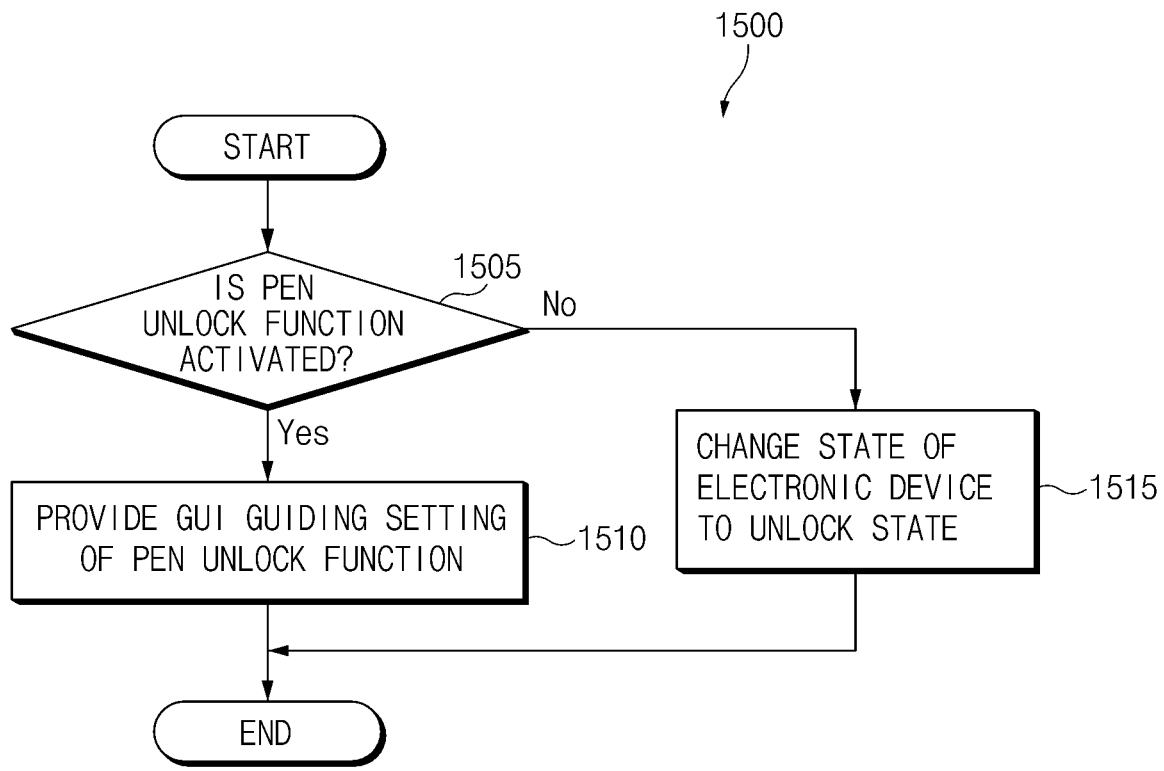
FIG. 15 illustrates a flowchart of an electronic device providing a user interface setting an unlock function according to an embodiment.

FIG. 15 illustrates a flowchart 1500 of the electronic device 101 providing the GUI 1415 setting an unlock function according to an embodiment.

Returning to FIG. 15, in step 1505, the electronic device 101 may identify whether the pen unlock function is activated, and may perform step 1505 in response to detecting that the digital pen 201 is detached from the electronic device 101. The electronic device 101 may perform step 1505 when a user input is received through a user interface of the digital pen 201 while the pen unlock function is deactivated.

When the pen unlock function is in a activated state, in step 1510, the electronic device 101 may display the GUI 1415 providing a guide so as to set the pen unlock function.

When the pen unlock function is in an deactivated state, in step 1515, the electronic device 101 may change the state of the electronic device 101 to the unlock state based at least partially on the unlock history information.

Figure 16:
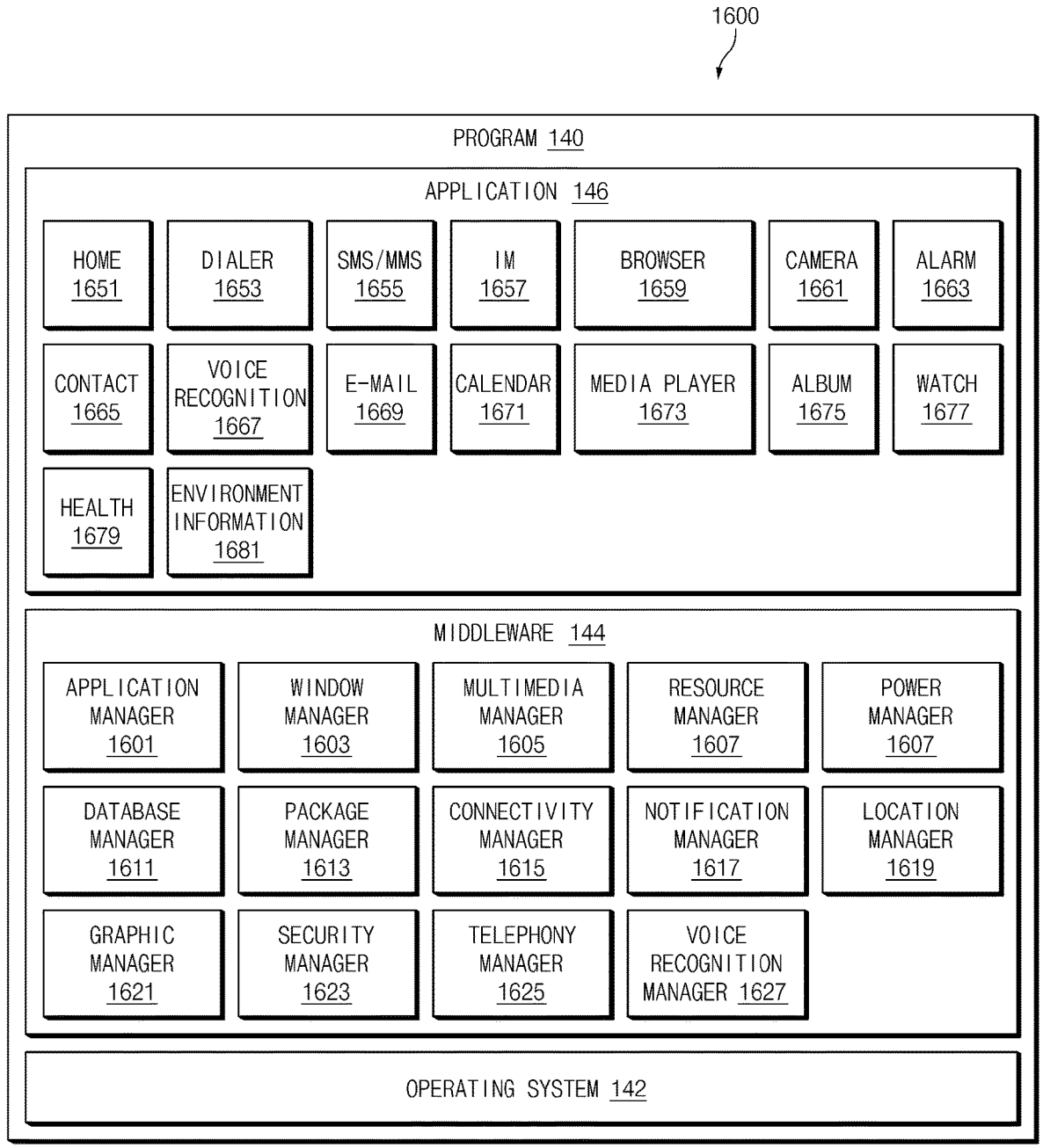
FIG. 16 illustrates a program according to an embodiment.

FIG. 16 is a block diagram 1600 illustrating the program 140 according to an embodiment.

Referring to FIG. 16, the program 140 may include the operating system 142 for controlling one or more resources of the electronic device 101, the middleware 144, or the application 146 executable in the operating system 142. The operating system 142 may include Android™, iOS™, Windows™, Symbian™, Tizen™, Bada™. For example, at least a part of the program 140 may be preloaded on the electronic device 101 when the electronic device 101 is being manufactured. Alternatively, when the electronic device 101 is used by the user, at least a part of the program 140 may be downloaded from an external electronic device or may be updated.

The operating system 142 may control the management of one or more system resources of the electronic device 101. Additionally or alternatively, the operating system 142 may include one or more driver programs for driving any other hardware devices of the electronic device 101 the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 is able to be used by the application 146. The middleware 144 may include an application manager 1601, a window manager 1603, a multimedia manager 1605, a resource manager 1607, a power manager 1609, a database manager 1611, a package manager 1613, a connectivity manager 1615, a notification manager 1617, a location manager 1619, a graphic manager 1621, a security manager 1623, a telephony manager 1625, or a voice recognition manager 1627.

The application manager 1601 may manage a life cycle of the application 146. The window manager 1603 may manage one or more GUI resources that are used in a screen. The multimedia manager 1605 may seize one or more formats necessary to play media files and may perform encoding or decoding on the corresponding media file among the media files by using a codec appropriate for the corresponding format selected from the formats. The resource manager 1607 may manage a source code of the application 146 or a storage space of the memory 130. The power manager 1609 may manage a capacity, a temperature, or a power of the battery 189 and may determine or provide relevant information necessary for an operation of the electronic device 101 by using information associated with the capacity, the temperature, or the power. The power manager 1609 may operate in conjunction with a basic input/output system (BIOS) of the electronic device 101.

The database manager 1611 may generate, search, or modify a database to be used by the application 146. The package manager 1613 may install or update an application that is distributed as a package file. The connectivity manager 1615 may manage the wireless connection or direct connection between the electronic device 101 and an external electronic device. The notification manager 1617 may provide a function for notifying the user of a specified event, such as an incoming call, a message, or a notification. The location manager 1619 may manage location information of the electronic device 101. The graphic manager 1621 may manage one or more graphic effects to be provided to the user or one or more user interfaces associated with the one or more graphic effects.

The security manager 1623 may provide system security or user authentication. The telephony manager 1625 may manage a voice call function or a video call function that is provided by the electronic device 101. The voice recognition manager 1627 may transmit voice data of the user to the server 108, and may receive a command, which corresponds to a function to be performed in the electronic device 101 based at least partially on the voice data, or character data, which are converted based at least partially on the voice data, from the server 108. The middleware 144 may remove one or more components of existing components dynamically or may add new components. At least a part of the middleware 144 may be included as a part of, or with separate software different from, the operating system 142.

The application 146 may include a home application 1651, a dialer application 1653, a short messaging service/multimedia messaging service (SMS/MMS) application 1655, an instant message (IM) application 1657, a browser application 1659, a camera application 1661, an alarm application 1663, a contact application 1665, a voice recognition application 1667, an e-mail application 1669, a calendar application 1671, a media player application 1673, an album application 1675, a watch application 1677, a health application 1679, or an environment information application 1681 (e.g., an application to measure an atmospheric pressure, humidity, or temperature information). The application 146 may further include an information exchanging application that may support information exchange between the electronic device 101 and an external electronic device. The information exchanging application may include a notification relay application configured to transmit specified information to an external electronic device or a device management application configured to manage the external electronic device. The notification relay application may transmit notification information corresponding to a specified event occurring in another application of the electronic device 101 to the external electronic device. Additionally or alternatively, the notification relay application may receive notification information from the external electronic device and may provide the received notification information to the user of the electronic device 101.

The device management application may control a power or a function of the external electronic device communicating with the electronic device 101 or some components of the external electronic device. Additionally or alternatively, the device management application may support the installation, deletion, or update of an application that operates in the external electronic device.

The application manager 1601 may manage an execution state (e.g., a running state, a foreground state, a background state, or a pause state) of at least one application stored in the electronic device 101 and may determine priorities of applications based on information of the applications or a user input.

The middleware 144 may further include an input management manager. The input management manager may perform a function of transmitting an event associated with an application to a relevant application based on a user input.

The package manager 1613 may manage information about application programs stored in the memory 130. The information about the application programs may include at least one of whether to support a user input through a user interface of the digital pen 201 and information about a key defined in the XML of an application program.

The application 146 may store at least one application program executable by the electronic device 101 as an instruction, and may include an extensible markup language (XML).

The application 146 may further include a remote action framework which may monitor an execution state of at least one application program through the application manager 1601 and may receive information about the application program from the package manager 1613. The remote action framework may display state information based on at least one of the execution state of the application program or the information about the application program.

As described above, an electronic device may include a housing, a touchscreen display that is viewable through a portion of the housing, a stylus pen that is sensible by the touchscreen display and includes a user interface, a wireless communication circuit that is disposed within the housing, a processor that is disposed within the housing and is operatively connected with the touchscreen display and the wireless communication circuit, and a memory that is disposed within the housing and is operatively connected with the processor. The memory may store unlock history information by at least one user authentication method and at least one application program, and may store instructions that, when executed, cause the processor to receive a first input received through the user interface of the stylus pen, through the wireless communication circuit, in a lock state of the electronic device, to identify the stored unlock history information by the at least one user authentication method, in response to receiving the first input, and to change a state of the electronic device to an unlock state, based at least partially on that the identified unlock history information exists.

The instructions may cause the processor to display an unlock screen providing the at least one user authentication method on the touchscreen display, based on that the identified unlock history information does not exist, to receive a user input according to the at least one user authentication method, and to determine whether to change the state of the electronic device from the lock state to the unlock state, in response to the user input.

The at least one user authentication method may include at least one of recognition of biometric information including at least one of fingerprint information or iris information, a password input, a PIN, or a pattern input.

The housing may include an inner space configured to receive the stylus pen, and the instructions cause the processor to detect whether the stylus pen is detached from the inner space and to identify an unlock history by the user authentication method, in response to detecting that the stylus pen is detached.

The instructions may cause the processor to detect that the stylus pen is inserted into the inner space and to change the unlock history information, in response to detecting that the stylus pen is inserted.

The instructions may cause the processor to identify an application program being executed before the lock state, in response to the change to the unlock state and to provide, on the touchscreen display, a user interface of the application program being executed, in response to the identification.

The instructions may cause the processor to provide a graphic user interface associated with a use of the stylus pen on the touch screen display, in response to the change to the unlock state.

The electronic device may further include a motion sensor, and the instructions may cause the processor to determine whether the electronic device moves, by using the motion sensor, based on that the identified unlock history information exists and to change the identified unlock history information, based at least partially on the determination about whether the electronic device moves.

The instructions may cause the processor to receive a second input received through the user interface of the stylus pen, through the wireless communication circuit, in the lock state of the electronic device, to identify an unlock history by the user authentication method, in response to receiving the second input, to identify a selected application program corresponding to the second input, in response to receiving the second input, to change the state of the electronic device to the unlock state, based on that the identified unlock history information exists, and to execute the selected application program.

The memory may store a first application program available in the unlock state of the electronic device and a second application program available in the lock state of the electronic device. The instructions may cause the processor to display an unlock screen by the user authentication method on the display, wherein, in a first operation, the selected application program corresponding to the second input is the first application program, and to execute the selected application program when the state of the electronic device is maintained in the lock state, wherein, in a second operation, the selected application program corresponding to the second input is the second application program.

The instructions may cause the processor to provide a user interface setting whether to unlock the electronic device by the first input.

The user interface of the stylus pen may include a button, and the first input may include at least one of pressing the button once and/or pressing the button twice.

The second input may include pressing the button during a specified time or more.

The wireless communication circuit is configured to support a Bluetooth standard and/or BLE communication.

As described above, a method of an electronic device may include receiving a first input from a stylus pen connected with the electronic device through wireless communication, in a lock state of the electronic device, identifying unlock history information by at least one user authentication method, in response to receiving the first input, and changing a state of the electronic device to an unlock state, based at least partially on that the identified unlock history information exists.

The method may further include displaying an unlock screen providing the at least one user authentication method, based on that the identified unlock history information does not exist, receiving a user input according to the at least one user authentication method, and determining whether to change the state of the electronic device from the lock state to the unlock state, in response to the user input.

The at least one user authentication method may include at least one of recognition of biometric information including at least one of fingerprint information or iris information, a password input, a PIN, or a pattern input.

The method may further include identifying an application program being executed before the lock state, in response to the change to the unlock state, and providing a user interface of the application program being executed, in response to the identification.

The method may further include determining whether the electronic device moves, based on that the identified unlock history information exists, and changing the identified unlock history information, based at least partially on the determination about whether the electronic device moves.

The method may further include receiving a second input from the stylus pen, in the lock state of the electronic device, identifying an unlock history by the user authentication method, in response to receiving the second input, identifying a selected application program corresponding to the second input, in response to receiving the second input, changing the state of the electronic device to the unlock state, based on that the identified unlock history information exists, and executing the selected application program.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Herein, an electronic device may provide continuity of use by unlocking the electronic device by using a stylus pen.

The electronic device may maintain security by permitting a stylus pen-based unlock function under a specified condition.

A variety of effects directly or indirectly understood through this disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing;
   a touchscreen display viewable through a portion of the housing;
   a stylus pen sensible by the touchscreen display and including a user interface;
   a wireless communication circuit disposed within the housing;
   a processor disposed within the housing and operatively connected with the touchscreen display and the wireless communication circuit; and
   a memory disposed within the housing and operatively connected with the processor,
   wherein the memory is configured to store at least one application program and unlock history information indicating existence of an unlock history, the unlock history being a history of unlock operations performed through at least one user authentication method,
   wherein the memory stores instructions that, when executed, cause the processor to:
      receive a first input received through the user interface of the stylus pen, through the wireless communication circuit, in a lock state of the electronic device;
      identify, in response to receiving the first input and based on unlock history information, whether there exists the unlock history;
      change a state of the electronic device to an unlock state, based at least partially on existence of the unlock history,
   wherein the memory is further configured to store a first application program available in the unlock state of the electronic device and a second application program available in the lock state of the electronic device,
   wherein the instructions further cause the processor to:
      receive a second input received through the user interface of the stylus pen, through the wireless communication circuit, in the lock state of the electronic device,
      identify a selected application program corresponding to the second input, in response to receiving the second input,
      display an unlock screen by the at least one user authentication method on the touchscreen display when the selected application program corresponding to the second input is the first application program, and
      execute the selected application program while maintaining the state of the electronic device in the lock state when the selected application program corresponding to the second input is the second application program.

2. The electronic device of claim 1, wherein the instructions further cause the processor to:
   display an unlock screen providing the at least one user authentication method on the touchscreen display, based on the identified unlock history information not existing;
   receive a user input according to the at least one user authentication method; and
   determine whether to change the state of the electronic device from the lock state to the unlock state, in response to the user input.

3. The electronic device of claim 2, wherein the at least one user authentication method includes at least one of recognition of biometric information including at least one of fingerprint information or iris information, a password input, a personal information number (PIN), and a pattern input.

4. The electronic device of claim 1, wherein the housing includes an inner space configured to receive the stylus pen, and
   wherein the instructions further cause the processor to:
   detect whether the stylus pen is detached from the inner space; and
   identify an unlock history by the user authentication method, in response to detecting that the stylus pen is detached.

5. The electronic device of claim 4, wherein the instructions further cause the processor to:
   detect that the stylus pen is inserted into the inner space; and
   change the unlock history information, in response to detecting that the stylus pen is inserted.

6. The electronic device of claim 1, wherein the instructions further cause the processor to:
   identify an application program being executed before the lock state, in response to the change to the unlock state; and
   provide, on the touchscreen display, a user interface of the application program being executed, in response to the identification.

7. The electronic device of claim 1, wherein the instructions further cause the processor to:
   provide a graphic user interface associated with a use of the stylus pen on the touch screen display, in response to the change to the unlock state.

8. The electronic device of claim 1, further comprising:
   a motion sensor,
   wherein the instructions further cause the processor to:

determine whether the electronic device moves, by using the motion sensor, based on the existence of the identified unlock history information; and change the identified unlock history information, based at least partially on the determination of whether the electronic device moves.

9. The electronic device of claim 1, wherein the instructions further cause the processor to:

identify the unlock history by the user authentication method, in response to receiving the second input;

change the state of the electronic device to the unlock state, based on the existence of the identified unlock history information; and execute the selected application program.

10. The electronic device of claim 1, wherein the instructions further cause the processor to:

provide a user interface that sets whether to unlock the electronic device by the first input.

11. The electronic device of claim 1, wherein the user interface of the stylus pen includes a button, and wherein the first input includes at least one of pressing the button once and pressing the button twice.

12. The electronic device of claim 11, wherein the second input includes pressing the button during at least a specified time.

13. The electronic device of claim 1, wherein the wireless communication circuit is configured to support a Bluetooth™ standard and/or Bluetooth low energy communication.

14. A method of an electronic device, comprising:

receiving a first input from a stylus pen connected with the electronic device through wireless communication, in a lock state of the electronic device;

identifying, in response to receiving the first input and based on unlock history information indicating existence of an unlock history, whether there exists the unlock history, the unlock history being a history of unlock operations performed through at least one user authentication method;

changing a state of the electronic device to an unlock state, based at least partially on existence of the unlock history;

receiving a second input received through the user interface of the stylus pen, through the wireless communication circuit, in the lock state of the electronic device;

identifying a selected application program corresponding to the second input, in response to receiving the second input;

displaying an unlock screen by the at least one user authentication method on the touchscreen display when the selected application program corresponding to the second input is the first application program; and executing the selected application program while maintaining the state of the electronic device in the lock state when the selected application program corresponding to the second input is the second application program.

15. The method of claim 14, further comprising:

displaying an unlock screen providing the at least one user authentication method, based on the identified unlock history information does not existing;

receiving a user input according to the at least one user authentication method; and determining whether to change the state of the electronic device from the lock state to the unlock state, in response to the user input.

16. The method of claim 14, wherein the at least one user authentication method includes at least one of recognition of biometric information including at least one of fingerprint information and iris information, a password input, a personal information number (PIN), and a pattern input.

17. The method of claim 14, further comprising:

identifying an application program being executed before the lock state, in response to the change to the unlock state; and providing a user interface of the application program being executed, in response to the identification.

18. The method of claim 14, further comprising:

determining whether the electronic device moves, based on the existence of identified unlock history information; and changing the identified unlock history information, based at least partially on the determination of whether the electronic device moves.

19. The method of claim 14, further comprising:

identifying the unlock history by the user authentication method, in response to receiving the second input;

changing the state of the electronic device to the unlock state, based on the existence of identified unlock history information; and executing the selected application program.

* * * * *